(12) United States Patent
Sigamani

(10) Patent No.: US 10,476,393 B2
(45) Date of Patent: Nov. 12, 2019

(54) MODIFIABLE DC-DC POWER CONVERTERS FOR PROVIDING DIFFERENT OUTPUT VOLTAGES

(71) Applicant: Astec International Limited, Kowloon (HK)

(72) Inventor: James Sigamani, Pasig (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 15/351,645

(22) Filed: Nov. 15, 2016

(65) Prior Publication Data
US 2017/0155332 A1    Jun. 1, 2017

Related U.S. Application Data

(60) Provisional application No. 62/261,731, filed on Dec. 1, 2015.

(51) Int. Cl.
*H02M 3/28* (2006.01)
*H01F 38/00* (2006.01)

(52) U.S. Cl.
CPC .............. *H02M 3/28* (2013.01); *H01F 38/00* (2013.01)

(58) Field of Classification Search
CPC ............ H02M 3/22; H02M 3/24; H02M 3/28; H02M 3/285; H02M 3/325; H02M 3/335; H02M 3/33507; H02M 3/33546; H02M 3/33561; H02M 3/33569; H02M 3/33592; H02M 3/33515; H02M 3/33523; H02M 3/3353; H02M 1/4208; H02M 1/4233; H02M 1/4241; H02M 1/4258; H02M 1/44; H02M 2001/0067; H02M 2001/007; H02M 2001/0074; H02M 2001/0077; H02M 2001/008; H01F 38/00; H01F 38/16; H01F 27/28; H01F 27/2804; H01F 2027/2809; H01F 2027/2819; H01F 2027/2814
USPC .... 363/15–21.03, 34, 40–43, 63–65, 67, 71, 363/123–127, 131, 132; 323/205–211, 323/222–226, 247–263, 271–273, 282, 323/283, 355; 336/130, 137–150, 199, 336/200, 212
See application file for complete search history.

(56) References Cited

U.S. PATENT DOCUMENTS 6,590,488 B2 * 7/2003 Marcotte ................. H01F 29/02
                                                                  336/192
6,628,531 B2   9/2003 Dadafshar
(Continued)

*Primary Examiner* — Gary L Laxton
*Assistant Examiner* — Carlos O Rivera-Perez
(74) *Attorney, Agent, or Firm* — Harness, Dickey & Pierce, P.L.C.

(57) ABSTRACT

A DC-DC power converter kit includes a body, a plurality of input connectors, and a plurality of output connectors. The body includes a plurality of inputs configured to couple to one another to form a power converter input, a plurality of outputs configured to couple to one another to form a power converter output, and a plurality of transformers. The power converter output is configured to provide a first output voltage when using a first set of the input connectors and a first output connector, and the power converter output is configured to provide a second output voltage different than the first output voltage when using a second set of the input connectors and a second output connector. Additional example power converter kits, power converters, and methods for adjusting an output voltage are also disclosed.

17 Claims, 19 Drawing Sheets

(56) References Cited

U.S. PATENT DOCUMENTS

| | | |
|---|---|---|
| 7,872,560 B2 | 1/2011 | Hsu |
| 8,154,891 B1 * | 4/2012 | Morico ............... H02M 3/3376 |
| | | 307/110 |
| 8,963,676 B1 | 2/2015 | Hoang |
| 2009/0085702 A1 * | 4/2009 | Zeng .................... H01F 27/292 |
| | | 336/107 |
| 2010/0314937 A1 * | 12/2010 | Jacobson ................ H02M 3/28 |
| | | 307/18 |
| 2016/0087548 A1 * | 3/2016 | Jezierski, Jr. ........... H02M 7/44 |
| | | 363/71 |

* cited by examiner

MODIFIABLE DC-DC POWER CONVERTERS FOR PROVIDING DIFFERENT OUTPUT VOLTAGES

CROSS-REFERENCE TO RELATED APPLICATION

This application claims the benefit of U.S. Provisional Application No. 62/261,731 filed Dec. 1, 2015. The entire disclosure of the above application is incorporated herein by reference.

FIELD

The present disclosure relates to modifiable DC-DC power converters for providing different output voltages.

BACKGROUND

This section provides background information related to the present disclosure which is not necessarily prior art.

Power converters can be designed to provide a particular output voltage. In some cases, the power converters can include one or more transformers and/or power switches. In some cases, the turns ratio of the transformers, the connection of the power converter inputs and outputs coupled to the transformers, and/or a duty cycle of the power switches can be specifically designed to provide the output voltage.

SUMMARY

This section provides a general summary of the disclosure, and is not a comprehensive disclosure of its full scope or all of its features.

According to one aspect of the present disclosure, a DC-DC power converter kit includes a body, a plurality of input connectors, and a plurality of output connectors. The body includes a plurality of inputs configured to couple to one another to form a power converter input, a plurality of outputs configured to couple to one another to form a power converter output, and a plurality of transformers. Each transformer includes two or more primary windings for coupling to one input of the plurality of inputs and at least one secondary winding for coupling to one output of the plurality of outputs. The plurality of input connectors are each configured to couple between the two or more primary windings of each transformer and between the plurality of inputs, and to change at least one of a connection between each of the two or more primary windings to adjust a turns ratio of each transformer and a connection between the plurality of inputs. The plurality of output connectors are each configured to couple between the plurality of transformers and the plurality of outputs to change a connection between the plurality of outputs. The power converter output is configured to provide a first output voltage when using a first set of the input connectors of the plurality of input connectors and a first output connector of the plurality of output connectors, and the power converter output is configured to provide a second output voltage different than the first output voltage when using a second set of the input connectors of the plurality of input connectors and a second output connector of the plurality of output connectors.

According to another aspect of the present disclosure, a method for adjusting an output voltage of a DC-DC power converter is disclosed. The power converter includes a plurality of inputs configured to couple to one another to form a power converter input, a plurality of outputs configured to couple to one another to form a power converter output, and a plurality of transformers. Each transformer includes two or more primary windings for coupling to one input of the plurality of inputs and at least one secondary winding for coupling to one output of the plurality of outputs. The method includes coupling a first set of input connectors of a plurality of input connectors between the two or more primary windings of each transformer and between the plurality of inputs, and an output connector of a plurality of output connectors between the plurality of transformers and the plurality of outputs so the power converter output is configured to provide a first output voltage. The method further includes coupling a second set of input connectors of the plurality of input connectors between the two or more primary windings of each transformer and between the plurality of inputs, and another output connector of the plurality of output connectors between the plurality of transformers and the plurality of outputs so the power converter output is configured to provide a second output voltage different than the first output voltage. The input connectors are each configured to change at least one of a connection between each of the two or more primary windings to adjust a turns ratio of each transformer and a connection between the plurality of inputs, and the output connectors are each configured to change a connection between the plurality of outputs.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1A:
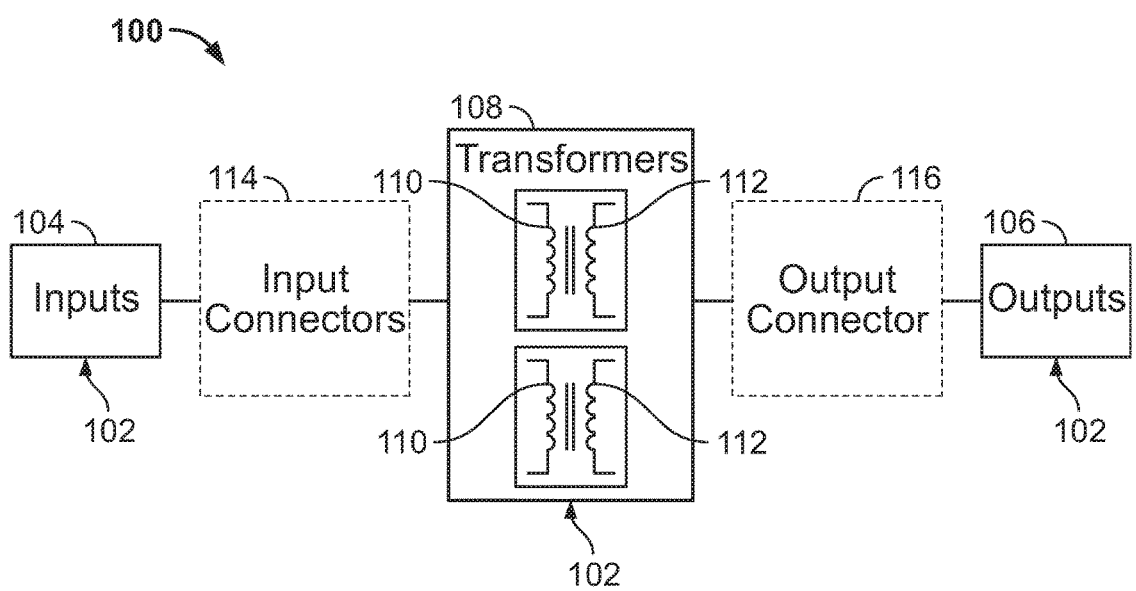
FIG. 1A is a block diagram of a DC-DC power converter including interchangeable input connectors, two transformers and an interchangeable output connector according to example embodiments of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, methods are provided for adjusting an output voltage of a DC-DC power converter including multiple inputs configured to couple to one another to form a power converter input, multiple outputs configured to couple to one another to form a power converter output, and multiple transformers. Each of the transformers includes two or more primary windings for coupling to one input of the multiple inputs and at least one secondary winding for coupling to one output of the multiple outputs. The method includes coupling a set of input connectors of multiple input connectors between the two or more primary windings of each transformer and between the multiple inputs, and an output connector of multiple output connectors between the multiple transformers and the multiple outputs so the power converter output can provide an output voltage. The method further includes coupling another set of input connectors of the multiple input connectors between the two or more primary windings of each transformer and between the multiple inputs, and another output connector of the multiple output connectors between the multiple transformers and the multiple outputs so the power converter output can provide another output voltage. The multiple input connectors change at least one of a connection between each of the two or more primary windings to adjust a turns ratio of each transformer and a connection between the multiple inputs, and the multiple output connectors change a connection between the multiple outputs.

By modifying the connection between the multiple outputs, the multiple inputs, and/or the primary windings of each transformer, a power converter can be designed to provide various different output voltages (e.g., regulated output voltages). As such, when a load coupled to the power converter output changes, a user (e.g., a manufacturer, a customer, etc.) can replace an existing input connector and/or output connector in the power converter with a new input connector and/or output connector to satisfy the new load requirements. In such examples, the remaining components of the power converter can remain the same.

As further explained below, the connections between the primary windings, the multiple inputs, and the multiple outputs can be a parallel connection, a series connection, and/or a combination of a series and a parallel connection. As such, the multiple inputs, the multiple outputs, and/or the primary windings can each be coupled in series, in parallel, or a combination of a series and a parallel connection.

For example, if the multiple inputs are coupled together in series, the multiple outputs can be coupled together in parallel. Alternatively, if the multiple inputs are coupled together in parallel, the multiple outputs can be coupled together in series. As further explained below, these contrasting connections between the multiple inputs and the multiple outputs ensure power sharing between the multiple transformers.

In some embodiments, the input connectors can change only the connection between each of the primary windings to adjust a turns ratio of the transformers. In such examples, the connection between the multiple inputs is not altered. In other examples, the input connectors can change only the connection between the multiple inputs without changing the connection between each of the primary windings. In that case, the turns ratio of each transformer is not altered. Alternatively, the input connectors can change both the connection between each of the primary windings and the connection between the multiple inputs if desired.

In some cases, and as further explained below, the output voltage may be adjusted without changing an output power of the power converter. For example, and as further explained below, the power converter may be initially designed to provide 12V at 4000 W. If necessary, the input connectors and/or the output connectors may be replaced such that the power converter can provide 24V at 4000 W.

Figure 1B:
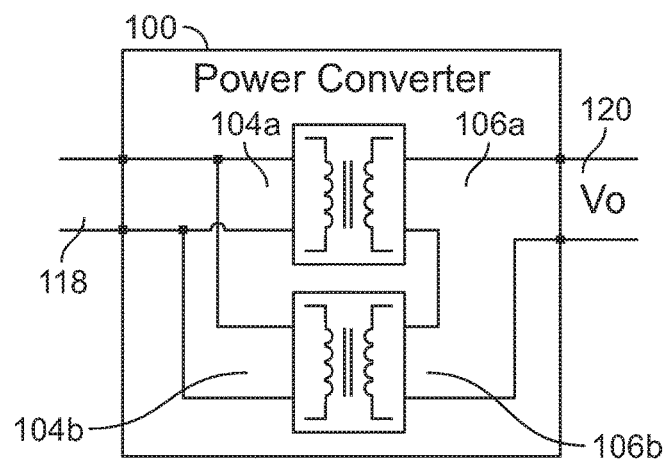
FIG. 1B is a block diagram of the DC-DC power converter of FIG. 1 having its transformer inputs coupled in parallel and its transformer outputs coupled in series according to another example embodiment.
Figure 1C:
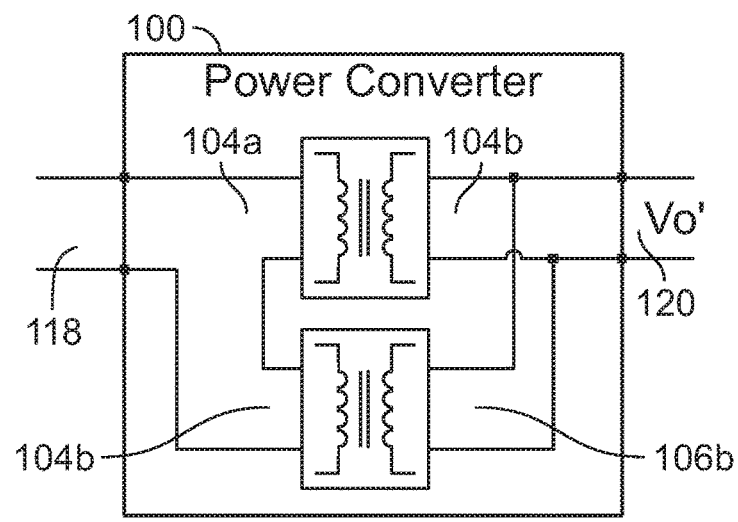
FIG. 1C is a block diagram of the DC-DC power converter of FIG. 1 having its transformer inputs coupled in series and its transformer outputs coupled in parallel according to yet another example embodiment.

FIGS. 1A-1C illustrate one example DC-DC power converter capable of implementing the method(s) disclosed herein. It should be understood that other suitable example converters may be employed as well.

For example, FIG. 1A illustrates a DC-DC power converter according to one example embodiment of the present disclosure and is indicated generally by reference number 100. As shown in FIG. 1A, the power converter 100 includes a body 102 having inputs 104, outputs 106, and transformers 108 each including primary windings 110 (only one shown for clarity) and a secondary winding 112. The power converter 100 further includes one set of input connectors 114 coupled between the primary windings 110 of each transformer 108 and between the inputs 104, and an output connector 116 coupled between the transformers 108 and the outputs 106.

Various different input connectors and/or output connectors are interchangeable in the power converter 100 to change a connection between the primary windings to adjust a turns ratio of the transformers, a connection between the inputs, and/or a connection between the outputs. Thus, and as explained above, the power converter 100 can provide one output voltage when using one set of input connectors and an output connector, and another output voltage when using another set of input connectors and another output connector.

For example, and as shown in FIG. 1B, the power converter 100 includes two inputs 104a, 104b (collectively the inputs 104 of FIG. 1A) connected in parallel to form a power converter input 118 due to a particular set of input connectors (e.g., the input connectors 114 of FIG. 1A). Similarly, the power converter 100 includes two outputs 106a, 106b (collectively the outputs 106 of FIG. 1A) connected in series to form a power converter output 120 (to provide an output voltage Vo) due to a particular output connector (e.g., the output connector 116 of FIG. 1A). Alternatively, and as shown in FIG. 1C, the inputs 104a, 104b of the power converter 100 may have a series connection forming the power converter input 118 while the outputs 106a, 106b of the power converter 100 may have a parallel connection forming the power converter output 120 to provide an output voltage Vo'. These different input and output configurations are due to different input and output connectors as compared to those used for the power supply in FIG. 1B.

Figure 2A:
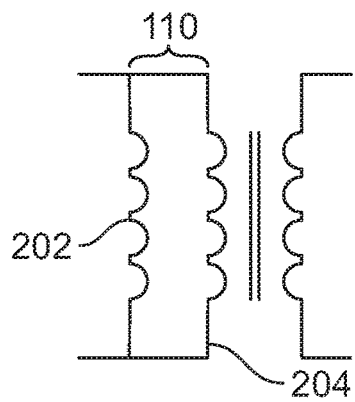
FIG. 2A is a circuit diagram of a transformer employable for any one of the transformers of FIG. 1A, having a parallel primary winding configuration according to another example embodiment.
Figure 2B:
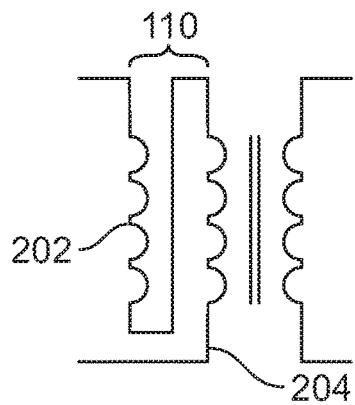
FIG. 2B is a circuit diagram of a transformer employable for any one of the transformers of FIG. 1A, having a series primary winding configuration according to yet another example embodiment.

Additionally, the primary windings 110 of FIG. 1A can be coupled in parallel or in series due to a particular set of input connectors. This causes the turns ratio of the transformers 108 to change. For example, FIG. 2A illustrates the primary windings 110 as including windings 202, 204 coupled in parallel and FIG. 2B illustrates the primary windings 110 as including windings 202, 204 coupled in series.

Preferably, the secondary winding 112 configurations of FIGS. 1A-C and 2A-B are not changed. For example, although changing output connectors may change an output voltage of the power converter 100, the differing output connectors does not change the secondary winding 112 configurations and thus does not alter the turns ratio of the transformers 108.

In some example embodiments, each transformer may include more than two primary windings. For example, FIGS. 3A, 4A, 5 and 6 illustrate DC-DC power converters 300, 400, 500, 600 each including a full bridge converter 302 having power switches Q1, Q2, Q3, Q4 for receiving an input voltage V1, an input 304 (sometimes referred to as a power converter input 304), transformers TX1, TX2, rectification circuits having diodes D1, D2, D3, D4, filter circuits having inductors L5, L6 and capacitors C1, C2 (collectively filter circuits 320, 322), and a power converter output 306 for providing an output voltage Vo. The power converter output 306 is formed by transformer outputs 308, 310 on the output side of the filter circuits 320, 322.

The transformers TX1, TX2 each include four primary windings P1, P2, P3, P4 coupled to the input 304 and two secondary windings S1, S2 coupled to the power converter output 306. The primary windings P1, P2, P3, P4 of each transformer TX1, TX2 are coupled to one another and the secondary windings S1, S2 of each transformer TX1, TX2 are coupled to one another. As shown in FIGS. 3A, 4A, 5 and 6, the rectification circuits are coupled to the secondary windings S1, S2 to form center tapped full wave rectifiers.

As explained herein, different input connectors and/or output connectors may be employed to change connections between transformer inputs (e.g., primary sides of the transformers), transformer primary windings, and/or transformer outputs of a power converter to adjust the output voltage Vo. For example, FIG. 3B illustrates a portion of the primary side of the transformers TX1, TX2 including a set of input connectors 312, 314, 316 to obtain the particular winding configuration of each transformer TX1, TX2 and the particular input configuration to form the power converter input 304 of FIG. 3A. Similarly, FIG. 3C illustrates a portion of the secondary side of the transformers TX1, TX2 including an output connector 318 to obtain the particular output configuration to form the power converter output 306 of FIG. 3A. The combination of these connectors 312, 314, 316, 318 allow the power converter 300 of FIG. 3A to provide a particular output voltage, as further explained below.

As shown in FIG. 3B, the input connectors 312, 314 each include eight terminals S1-S4, F1-F4, and the input connector 316 includes four terminals S1-S2, F1-F2. The terminals of the input connectors 312, 314 are coupled to the primary windings P1, P2, P3, P4 of each transformer and the terminals of the input connector 316. Similarly, the output connector 318 of FIG. 3C includes four terminals R1-R2, O1-O2 coupled to the transformers TX1, TX2 via the filter circuits 320, 322.

By using the input connectors 312, 314, the four primary windings P1, P2, P3, P4 of each transformer TX1, TX2 are coupled in parallel. If each primary winding includes five turns and each secondary winding includes one turn (as in the particular example of FIG. 3A), each transformer TX1, TX2 has a turns ratio N of 5:1. Additionally, the primary windings of each transformer TX1, TX2 are coupled in series with the bridge converter 302 due to the input connector 312, and the transformer outputs 308, 310 of the power converter 300 are coupled in parallel (to form the power converter output 306) due to the output connector 318. Thus, the connection between the transformer inputs is a series connection and the connection between the transformer outputs is a parallel connection. As further explained below, this configuration ensures power balancing between the transformer outputs.

As the parallel coupled primary windings of each transformer TX1, TX2 are coupled in series with the bridge converter 302, the voltage across each primary winding is half the input voltage V1. Thus, if the power converter 300 is designed to have, for example, a 6 V/1000 W output and the power converter 300 receives a 12 V/500 W input, the output of each transformer provides 6 V/500 W (during its cycle) due to the 5:1 turns ratio, center tapped configuration, etc.

The current through each transformer output 308, 310 can be calculated by dividing the power provided by each transformer output by the voltage of each transformer output. Thus, in this particular example, the current through each transformer output 308, 310 is 83.3 A (i.e., 500 W÷6V).

Because the parallel coupled primary windings of the transformer TX1, TX2 are connected in series, a current I_py through each primary side of the transformers TX1, TX2 is the same. This current I_py can then be used to find the current in the secondary windings S1, S2 by multiplying the current I_py by the turns ratio (N) (i.e., the current I_py×5). In this particular example, each transformer output 308, 310 shares the secondary winding current equally ensuring equal power sharing at the output of the power converter 300 due to the parallel connection of the outputs 308, 310.

Additionally, because the transformer outputs 308, 310 are coupled in parallel, the power (e.g., 500 W) from the two outputs 308, 310 are added together to obtain the power at the power converter output 306. As such, in this particular example, the output from the power converter 300 is 6 V at 1000 W.

In the particular example of FIGS. 3A, 4A, 5 and 6, a total leakage inductance of each transformer TX1, TX2 is represented by inductance Llk1, Llk2, respectively. The inductances Llk1, Llk2 are proportional to the square of the transformer primary turns ((Npy)^2) and may create duty cycle loss as they delay the secondary side current from ramping up during each cycle. This delay (dt) and an energy (ELlk) due to the leakage inductance can be calculated by equations (1) and (2), respectively, below for the particular example of FIG. 3A.

$$dt = \frac{Llk * I}{V} \quad (1)$$

$$E_{Llk} = \frac{1}{2} \times Llk * I^2 \quad (2)$$

Where Llk is the leakage inductance, I is a primary winding current (e.g., the current I_py), and V is the voltage at the primary side of the transformers (V1±2).

Assuming the leakage inductances are the same, the delay (dt) and the energy (ELlk) can be simplified to equations (3) and (4), respectively, below.

$$dt = \frac{(Llk1 + Llk2) * I\_py}{V1} = \frac{2 \times Llk1 * I\_py}{V1} = \frac{2 \times Llk2 * I\_py}{V1} \quad (3)$$

$$E_{Llk} = \frac{1}{2} Llk1 * I_{py}^2 + \frac{1}{2} Llk2 * I_{py}^2 = \frac{1}{2}(2 * Llk1) * I_{py}^2 = \frac{1}{2}(2 * Llk2) * I_{py}^2 \quad (4)$$

Additionally, the magnetizing inductances of the transformers TX1, TX2 can be represented by Lm1, Lm2, respectively. Assuming the magnetizing inductances of the transformers are equal, the total magnetizing inductance Lmag seen by the bridge converter 302 is shown in equation (5) below.

$$Lmag = 2 \times Lm1 = 2 \times Lm2 \quad (5)$$

If, for some reason, a load coupled to the power converter 300 changes (e.g., a new load, existing load demands increase, etc.), one or more of the connectors 312, 314, 316, 318 of FIGS. 3B-3C may be replaced with different connectors. For example, the power converter 400 of FIG. 4A is the power converter 300 of FIG. 3, but with its transformer inputs connections, transformer primary windings connections, and/or transformer outputs connections modified. These modified connections are realized by using different connectors.

Figure 3B:
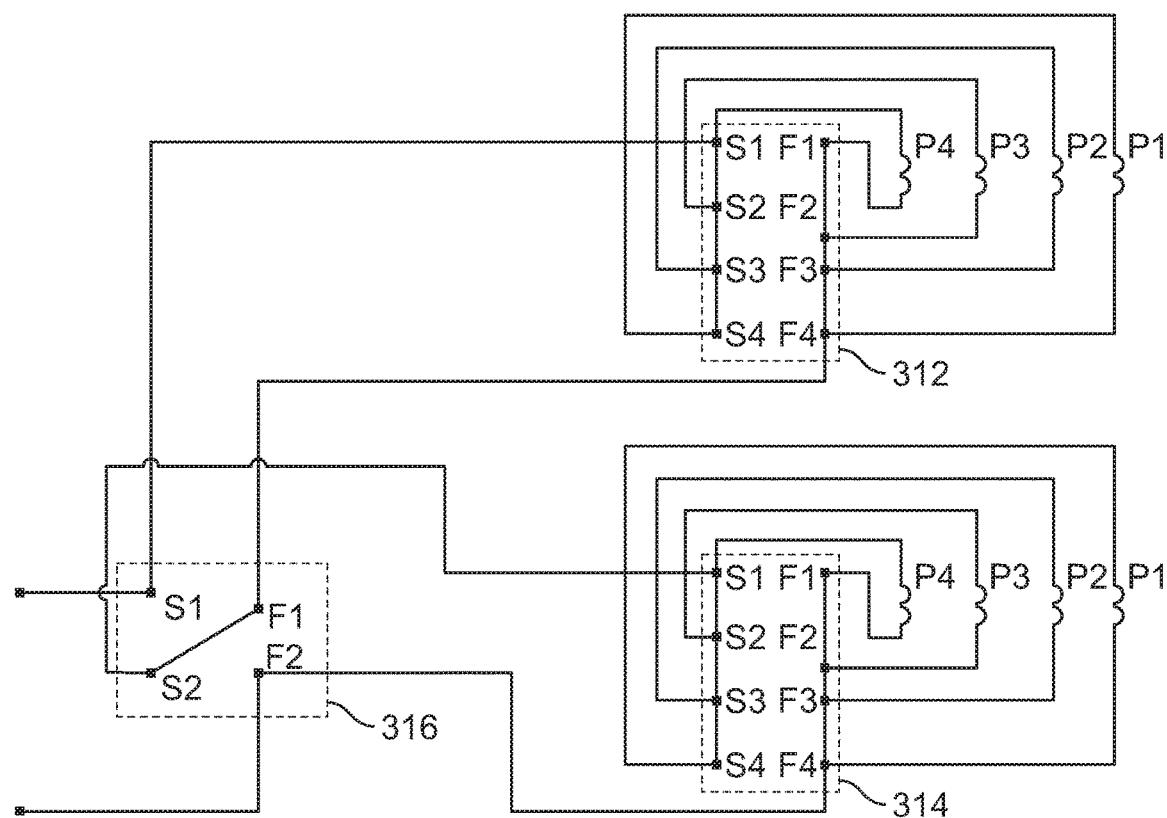
FIG. 3B is a circuit diagram of a primary side of the DC-DC power converter of FIG. 3A including three input connectors according to yet another example embodiment.
Figure 3C:
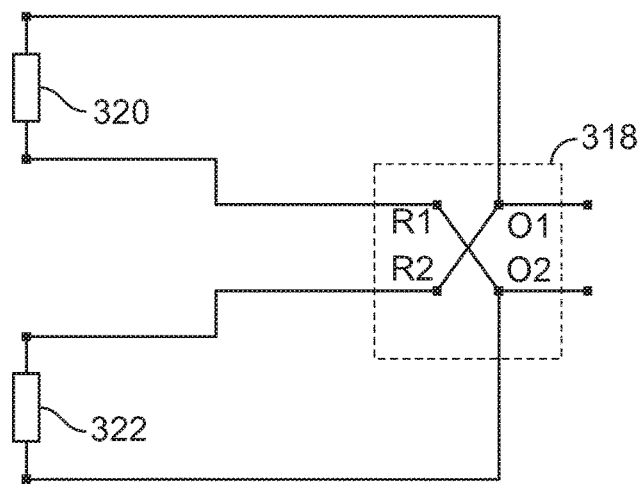
FIG. 3C is a circuit diagram of transformer outputs of the DC-DC power converter of FIG. 3A including one output connector according to another example embodiment.
Figure 4A:
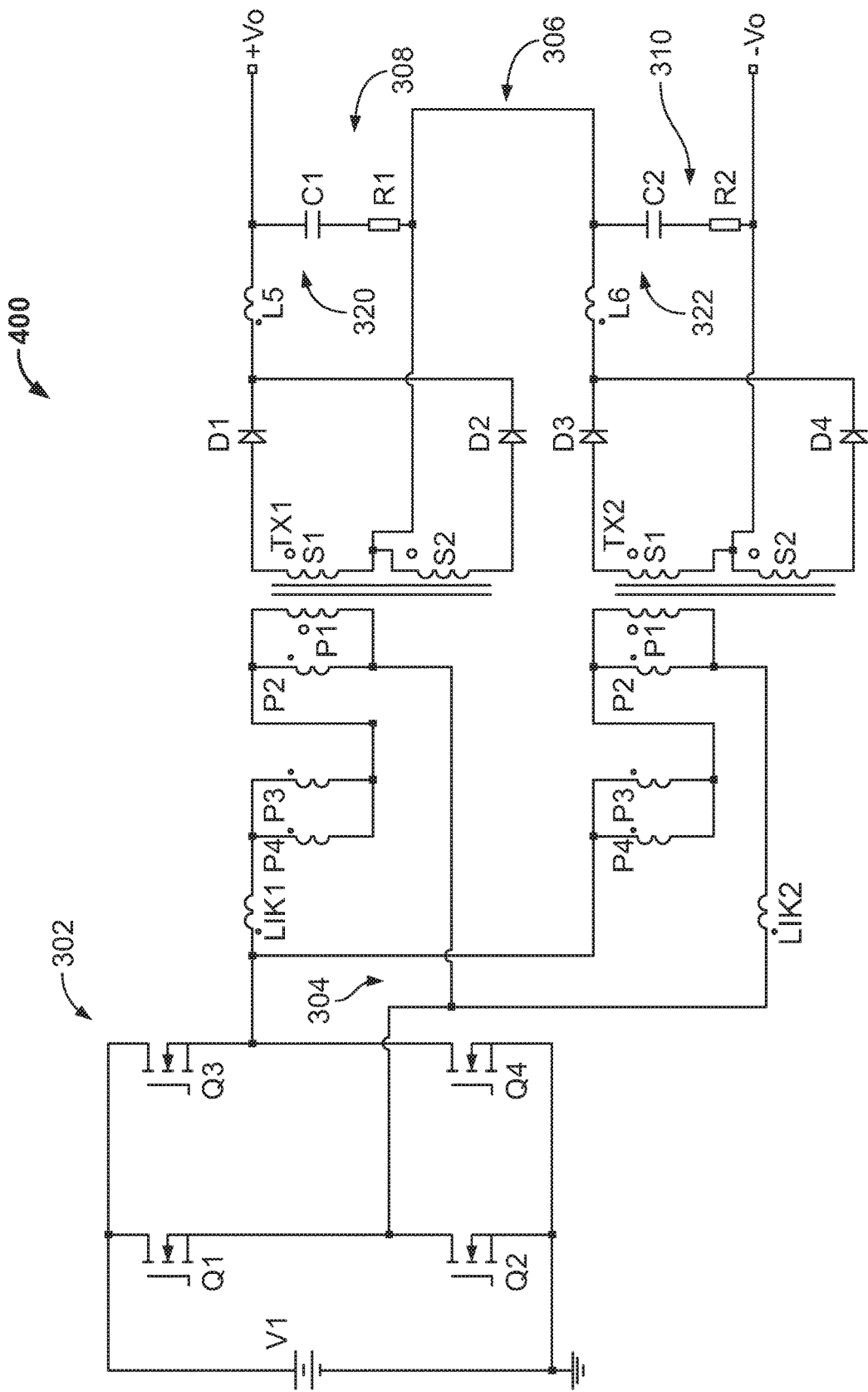
FIG. 4A is a circuit diagram of a DC-DC power converter including two transformers having their inputs coupled in parallel and their outputs coupled in series according to yet another example embodiment.
Figure 4B:
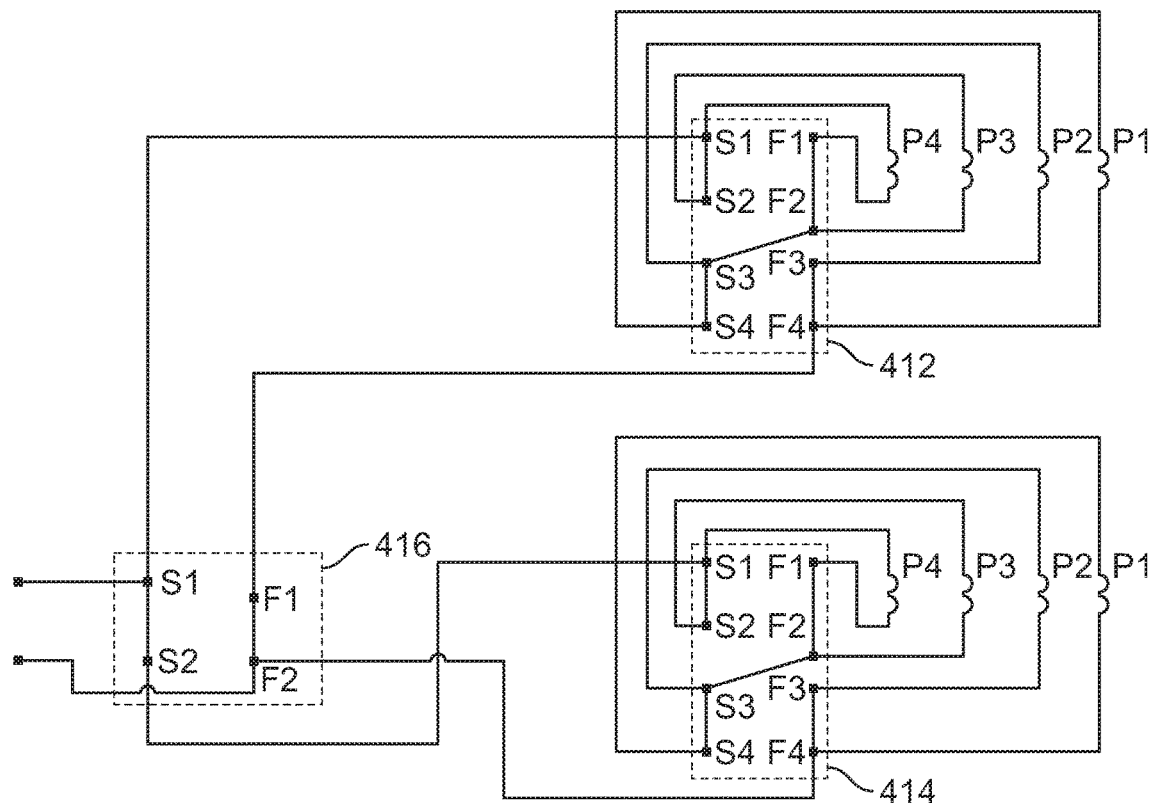
FIG. 4B is a circuit diagram of a primary side of the DC-DC power converter of FIG. 4A including three input connectors according to another example embodiment.
Figure 4C:
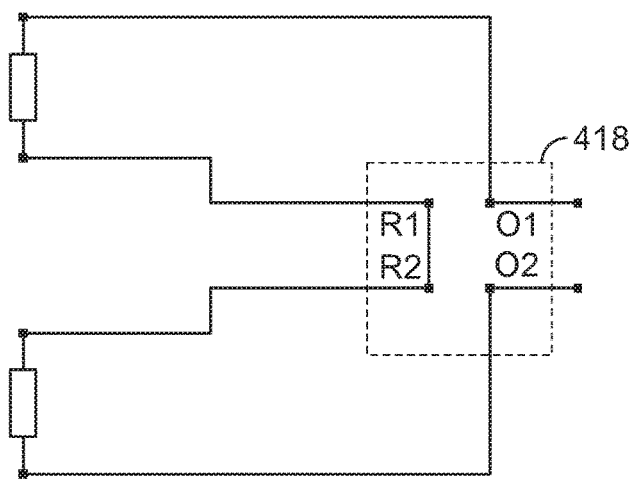
FIG. 4C is a circuit diagram of transformer outputs of the DC-DC power converter of FIG. 4A including one output connector according to yet another example embodiment.

For example, FIG. 4B illustrates a portion of the primary side of the transformers TX1, TX2 of FIG. 4A including a set of input connectors 412, 414, 416 to obtain the particular winding configuration of each transformer and the particular input configuration forming the power converter input 304 of FIG. 4A. FIG. 4C illustrates a portion of the secondary side of the transformers TX1, TX2 of FIG. 4A including an output connector 418 to obtain the particular output configuration forming the power converter output 306 of FIG. 4A. The connectors 412, 414, 416, 418 of FIGS. 4B and 4C include similar terminals as explained above relative to the connectors 312, 314, 316, 318 of FIGS. 3B and 3C. The terminals of FIGS. 4B and 4C, however, are coupled together and to the primary windings differently relative to the terminals of FIGS. 3B and 3C to obtain the particular configuration shown in FIG. 4A.

By using the input connectors 412, 414 of FIG. 4B, the primary windings P1, P2 of each transformer TX1, TX2 shown in FIG. 4A are coupled in parallel and the primary windings P3, P4 of each transformer TX1, TX2 are coupled in parallel. The parallel coupled windings P1, P2 and the parallel coupled windings P3, P4 of each transformer are then coupled in series. Thus, the primary winding configuration of FIG. 4A includes a combination of a series and a parallel connection. This configuration adjusts the turns ratio N of each transformer TX1, TX2 to 10:1.

Additionally, the bridge converter 302 of FIG. 4A is now coupled in parallel with the primary windings of each transformer TX1, TX2 due to the input connector 416, and the transformer outputs 308, 310 of the power converter 400 are coupled in series to form the power converter output 306 due to the output connector 418. Thus, the connection between the transformer inputs is a parallel connection and the connection between the transformer outputs is a series connection.

Figure 3A:
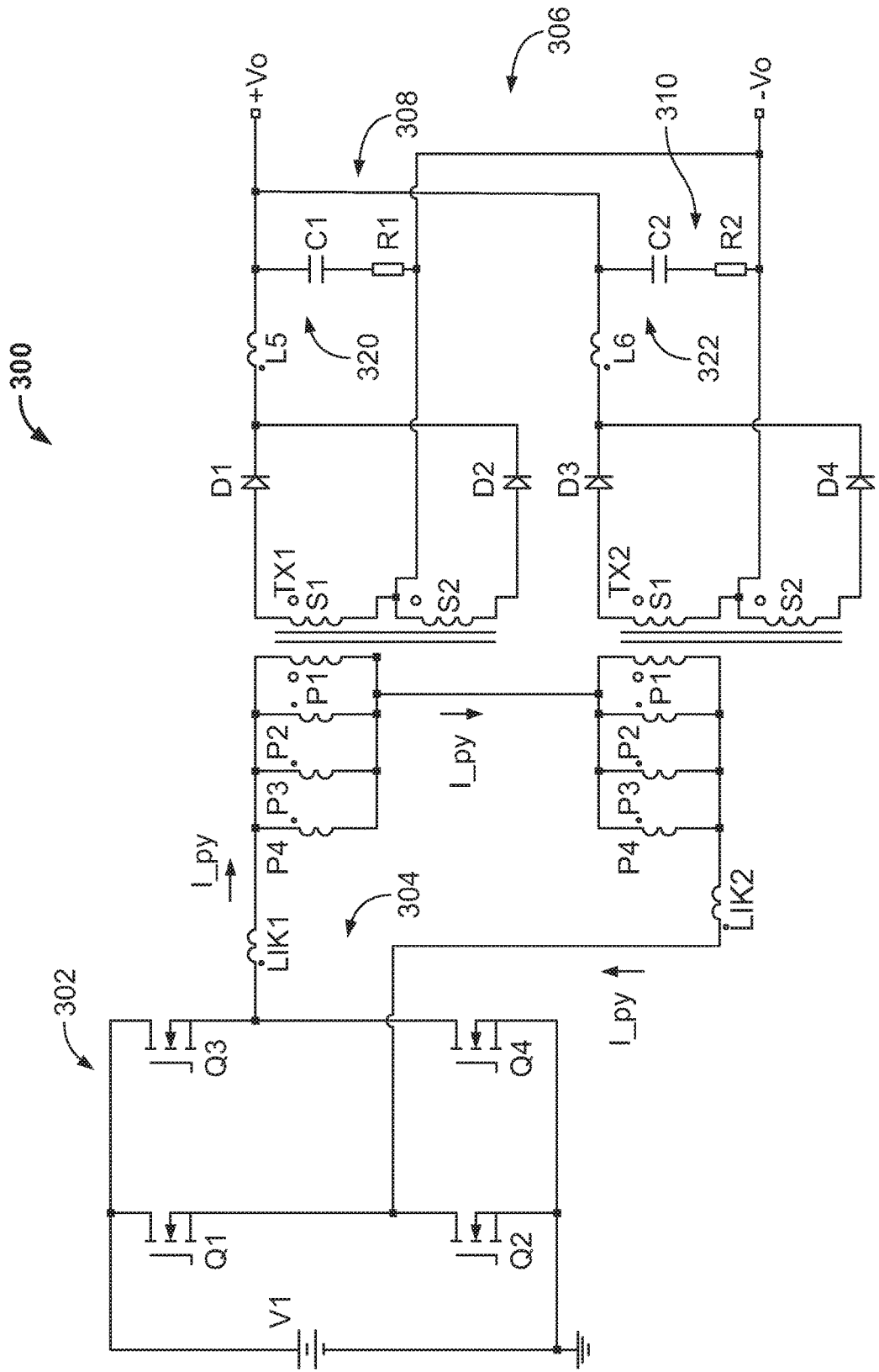
FIG. 3A is a circuit diagram of a DC-DC power converter including two transformers each having a parallel primary winding configuration according to another example embodiment.

Due to the input connector 416, the transformer inputs of FIG. 4A receive the full input voltage V1 (e.g., a 12 V/500 W input), instead of half the input voltage V1 as in FIG. 3A. As the turns ratio N is now 10:1, each transformer output 308, 310 of FIG. 4A provides 6V during its cycle as before. Because the outputs 308, 310 are coupled in series, the power converter 400 provides a 12V output (i.e., 6V from each output 308, 310).

Additionally, although the voltage received at the transformers TX1, TX2 of FIG. 4A is twice as large as the voltage received at the transformers TX1, TX2 of FIG. 3A, the flux density of each transformer of FIG. 4A remains substantially the same as in FIG. 3A for the same core area and frequency. This is because the number of primary winding turns in FIG. 4A is two times the number of primary winding turns in FIG. 3A.

Assuming the power required by the load has not changed (i.e., remains at 1000 W as in FIG. 3A), the output current which flows through each transformer output 308, 310 will be 83.3 A (i.e., 1000 W±12V). Thus, the current flowing through each transformer output of FIG. 4A is the same as the current flowing through each transformer output of FIG. 3A. As a result, the switching losses in switches (e.g., diodes D1-D4, etc.) on the secondary side of the transformers TX1, TX2 will remain the same.

The current flowing through the primary side of each transformer TX1, TX2 in FIG. 4A is shared. This is due to, for example, the parallel connected transformer inputs and the same current (83.3 A) flowing through each transformer output 308, 310.

A reflected load current of FIG. 4A is also reduced compared to a reflected load current of FIG. 3A. For example, the reflected load current in the transformer inputs of FIG. 4A will be about half as much as in FIG. 3A due to the increased number of primary turns.

Further, as the number of primary turns has doubled (i.e., 5 turns to 10 turns), the resistance of the primary windings has also doubled. But, as the transformer inputs in FIG. 4A are coupled in parallel and the turns ratio N has doubled (5:1 to 10:1) for the same secondary winding current (83.3 A), the primary side current of FIG. 4A will be half the primary side current I_py of FIG. 3A. As such, the winding losses due to resistance of the primary windings will remain the same in the power supplies 300, 400 of FIGS. 3A and 4A.

In addition, because the primary number of turns of FIG. 4A is two times the primary number of turns of FIG. 3A, the leakage inductances Llk1, Llk2 will be four times larger than the leakage inductances Llk1, Llk2 of FIG. 3A. This is because the leakage inductances Llk1, Llk2 are proportional to the square of the transformer primary turns as explained above. As the primary side current in FIG. 4A is half the primary side current I_py in FIG. 3A (as explained above), the delay (dt) of the current through each transformer TX1, TX2 in FIG. 4A and the energy (ELlk) due to the leakage inductance can be calculated as shown in equations (6) and (7), respectively, below.

$$dt = \frac{4Llk1 * \frac{I\_py}{2}}{V1} = \frac{4Llk2 * \frac{I\_py}{2}}{V1} = \frac{2Llk1 * I\_py}{V1} = \frac{2Llk2 * I\_py}{V1} \quad (6)$$

$$E_{Llk} = \frac{1}{2}(4Llk1) * \left(\frac{I_{py}}{2}\right)^2 + \frac{1}{2}(4Llk2) * \left(\frac{I_{py}}{2}\right)^2 = \quad (7)$$
$$\frac{1}{2}(2Llk1) * I_{py}^2 = \frac{1}{2}(2 * Llk2) * I_{py}^2$$

As can be seen, the delay (dt) in FIG. 4A (i.e., equation (6)) is the same as the delay in FIG. 3A (i.e., equation (3)), assuming the leakage inductances Llk1, Llk2 are the same as before. Likewise, the leakage energy (ELlk) for the power converter 400 of FIG. 4A and the power converter 300 of FIG. 3A are the same.

Additionally, the magnetizing inductance from the transformers TX1, TX2 of FIG. 4A becomes four times larger than the magnetizing inductance of FIG. 3A, due to the increase in the number of primary turns in FIG. 4A as compared to FIG. 3A. But, because the primary sides of the transformers TX1, TX2 are coupled in parallel in FIG. 4A, the effective magnetizing inductance Lmag seen by the bridge converter 302 will be the same as equation (5) above (i.e., Lmag=2×Lm1=2×Lm2). As such, the total magnetizing current seen by the bridge converter 302 will be the same as in FIG. 3A.

Figure 5:
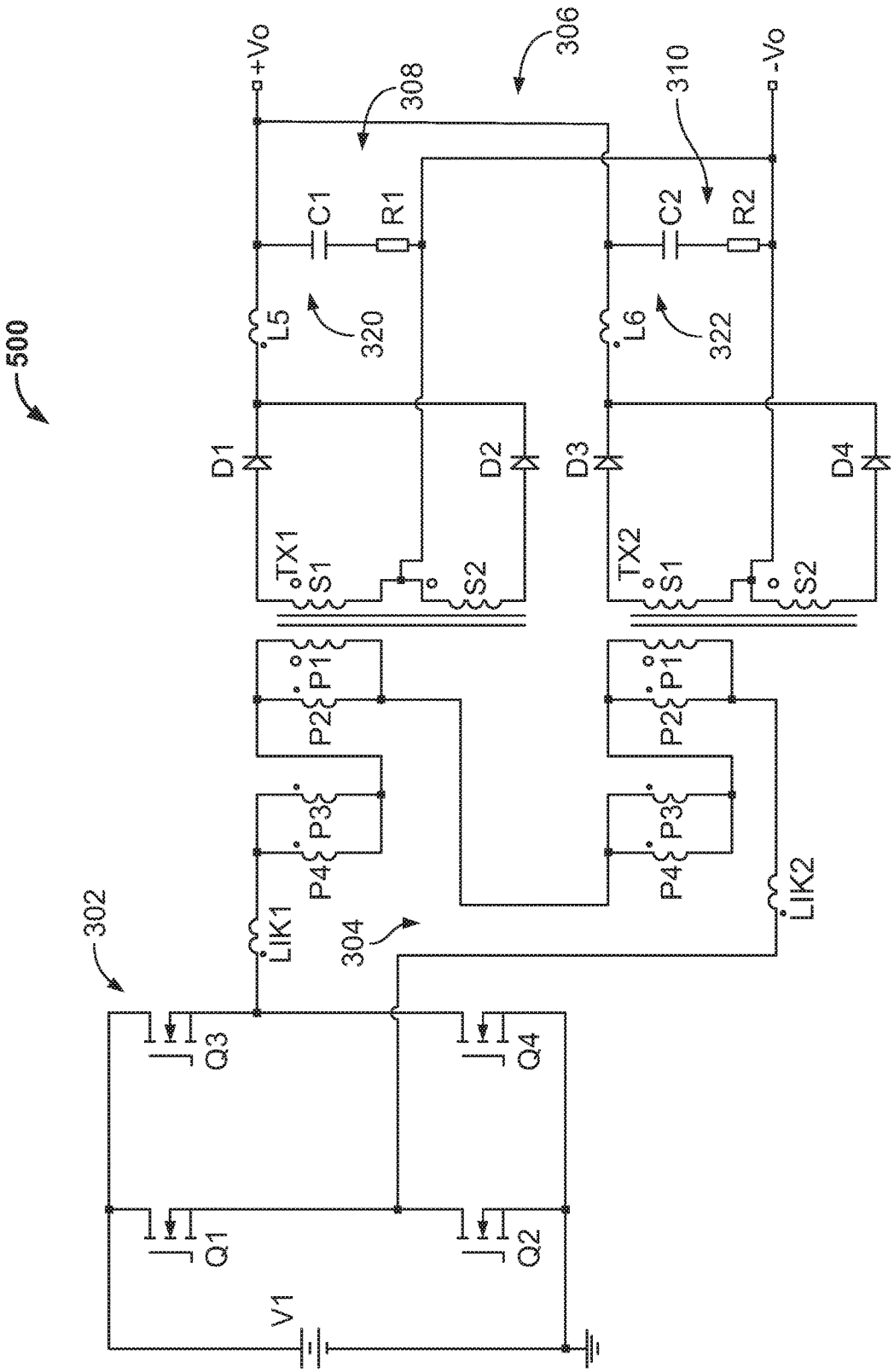
FIG. 5 is a circuit diagram of a DC-DC power converter including two transformers having their inputs coupled in series and their outputs coupled in parallel according to another example embodiment.
Figure 6:
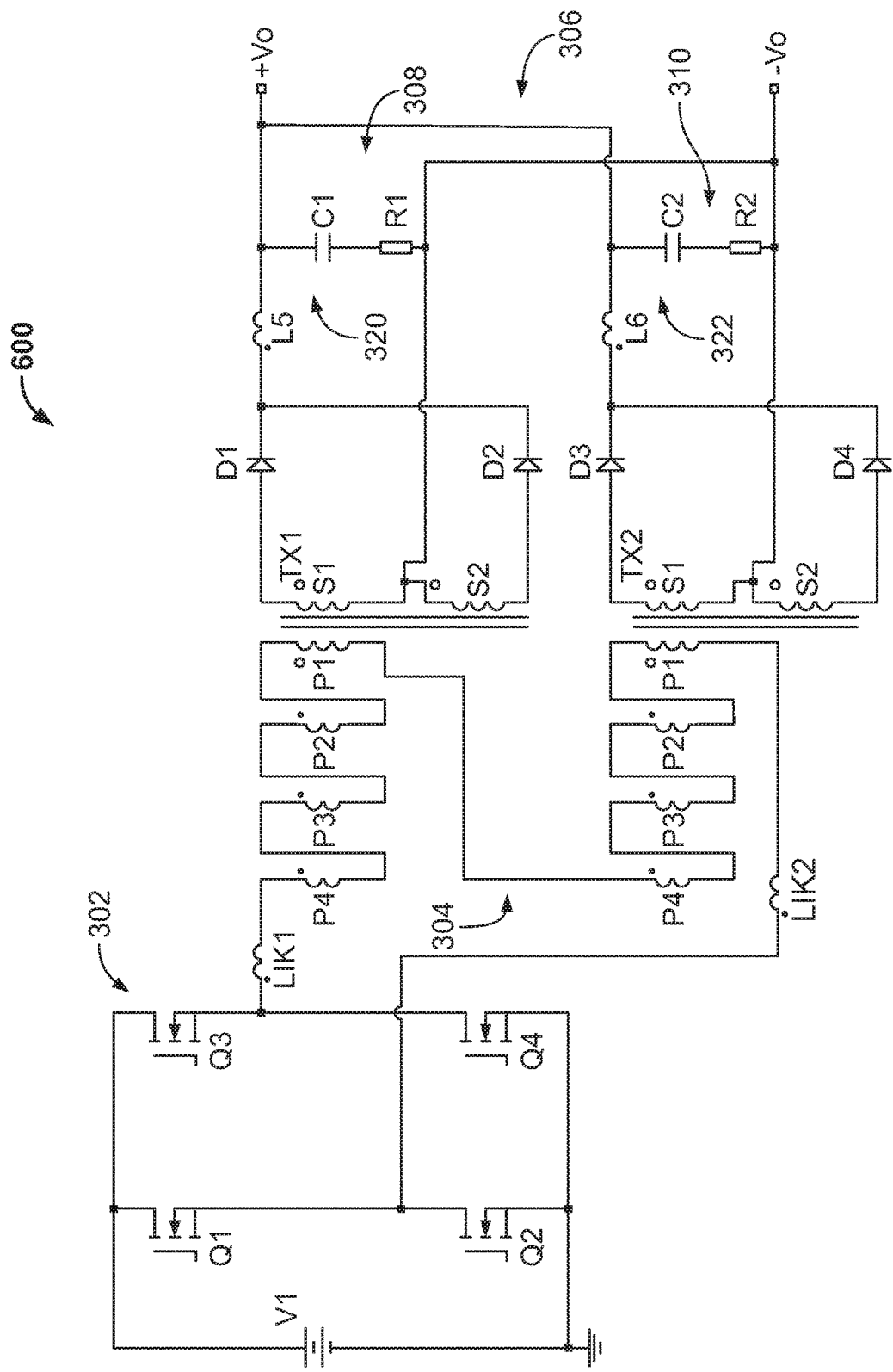
FIG. 6 is a circuit diagram of a DC-DC power converter including two transformers each having a series primary winding configuration according to another example embodiment.

Further, the leakage energy (ELlk), the delay (dt), and the magnetizing current from the magnetizing inductance (Lmag) help achieve zero voltage switching in the power converter 400 of FIG. 4A, as well as in the power converters of FIGS. 3A, 5, and 6.

As a result of the above characteristics, the output power and efficiency are not compromised when replacing the input and output connectors to modify particular connections between the power converter 300 of FIG. 3A and the power converter 400 of FIG. 4A. As such, replacing the connectors to modify particular connections between the power converters 300, 400 allows the output voltage to change while not effecting output power and converter efficiency.

In other cases, another output voltage Vo can be provided to a load (not shown). For example, and as shown in FIG. 5, the power converter 500 includes the bridge converter 302 coupled in series with the primary windings of the transformers TX1, TX2, and the transformer outputs 308, 310 coupled in parallel. Additionally, the primary windings P1, P2, P3, P4 of each transformer TX1, TX2 of FIG. 5 are coupled together in the same configuration as the primary windings P1, P2, P3, P4 of FIG. 4A. Thus, the power converter 500 may include similar input and output connectors as the connectors 316, 318 of FIGS. 3B and 3C and the input connectors 412, 414 of FIG. 4B.

Like in FIG. 4A, the turns ratio N of each transformer TX1, TX2 of FIG. 5 is 10:1. Accordingly, in this particular example, each transformer output 308, 310 of FIG. 5 provides 3V. The power converter output 306 of FIG. 5 likewise provides 3V due to the parallel connection between transformer outputs.

As the two transformer output 308, 310 of FIG. 5 are coupled in parallel, the output power will equal the output voltage of each transformer output multiplied by the current through each transformer output (calculated above with respect to FIG. 3A) multiplied by two (representing the number of transformer outputs). Thus, the output power is 500 W (i.e., 3V×83.3 A×2). Therefore, the power converter 500 provides 3V at 500 W.

The power converter 600 of FIG. 6 is another configuration that provides another output voltage Vo. For example, the connections between the transformer inputs and between the transformer outputs 308, 310 of FIG. 6 are the same as those in the power converter 500 of FIG. 5. The primary windings P1, P2, P3, P4 of each transformer TX1, TX2 of FIG. 6, however, are coupled in series. This series connected primary winding configuration results in a turns ratio N of 20:1. Thus, the power converter 600 may include similar input and output connectors as the connectors 316, 318 of FIGS. 3B and 3C, and additional input connectors for achieving the particular primary winding configuration for each transformer TX1, TX2.

As a result of the transformer input connections, the transformer output connections, and the primary winding connections of FIG. 6, the output voltage of the power converter 600 is 1.5V and the output power is 250 W. Therefore, although the output voltage Vo can be reduced in the power converter 500 (and the power converter 600 as explained above) compared to the output voltage Vo of the power converters 300, 400, the output power is compromised in doing so.

Likewise, the efficiency of the power converters 500, 600 may be reduced as compared to the power converters 300, 400 as the losses (e.g., duty cycle losses, switching losses, etc.) are the same as calculated above. Core losses in the power converters 500, 600, however, may be reduced compared to the power converters 300, 400 due to reduced flux density. These power and efficiency reductions, however, may be tolerable depending on the desire to reduce the output voltage Vo.

The teachings disclosed herein may be implemented in power converters including more than two transformers. For example, FIGS. 7A, 8A, 9A, 10 and 11 illustrate DC-DC power converters 700, 800, 900, 1000, 1100 substantially similar to the power converters of FIGS. 3-6, but including four transformers TX1, TX2, TX3, TX4. Similar to the power converters of FIGS. 3-6, the power converters of FIGS. 7-11 include the full bridge converter 302, an input 704 (sometimes referred to as a power converter input 704), rectification circuits having diodes D1-D8 coupled to the secondary windings S1, S2 to form center tapped full wave rectifiers, filter circuits having inductors L5-L8 and capacitors C1-C4 (collectively filter circuits 720, 722, 724, 726), and a power converter output 706 for providing the output voltage Vo. The power converter output 706 is formed by transformer outputs 708, 710, 712, 714 on the output side of the filter circuits 720, 722, 724, 726. The output voltage Vo of the power converters 700, 800, 900, 1000, 1100 may be adjusted depending on, for example, transformer input connections, transformer output connections, and primary winding connections, as explained above.

Figure 7A:
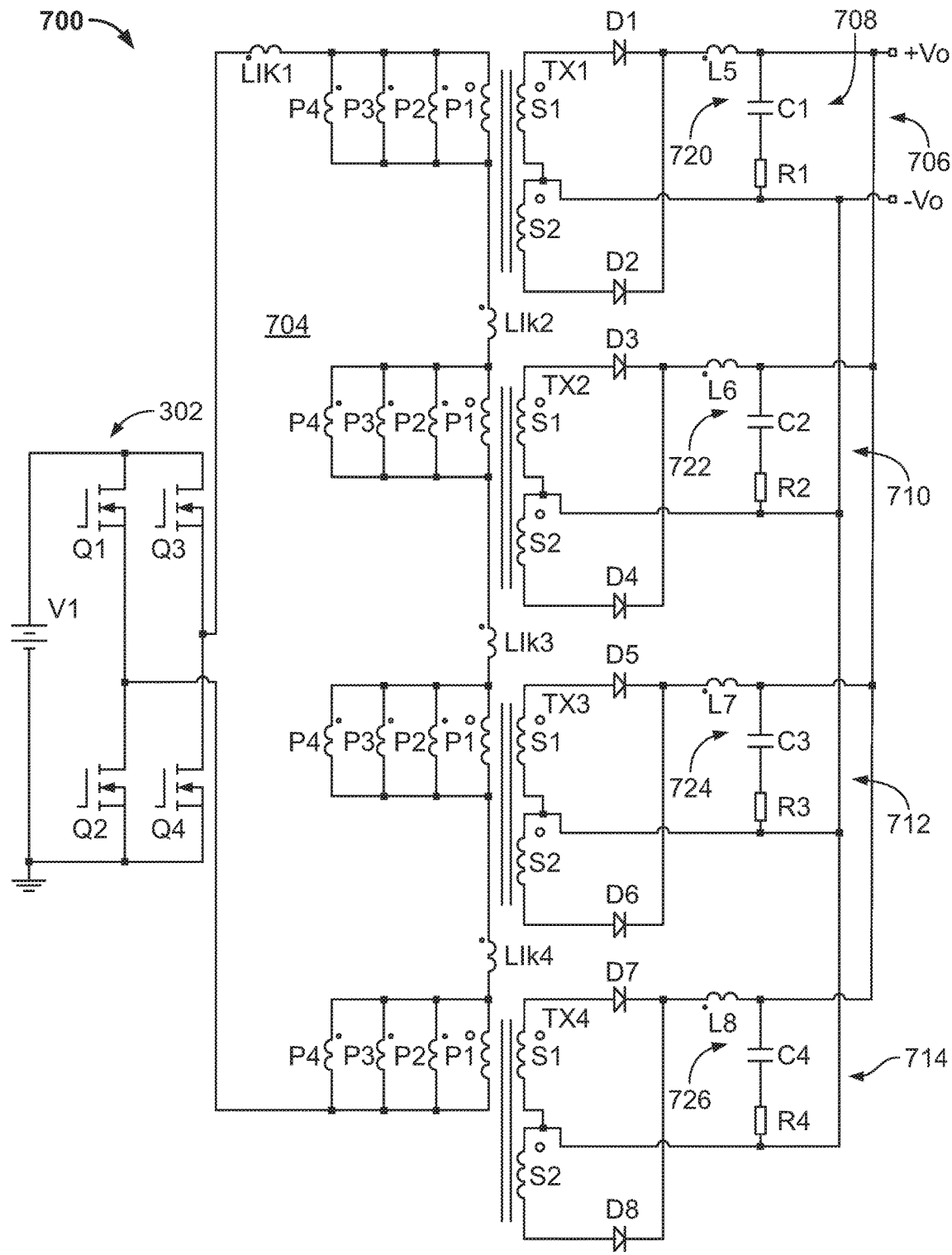
FIG. 7A is a circuit diagram of a DC-DC power converter including four transformers each having a parallel primary winding configuration according to yet another example embodiment.

For example, and with reference to FIG. 7A, the four primary windings P1, P2, P3, P4 of each transformer TX1, TX2, TX3, TX4 are coupled in parallel. This primary winding configuration results in a turns ratio N of 5:1 as explained above. Additionally, the transformer inputs are coupled in series with the bridge converter 302 (as explained above) and the transformer outputs are coupled in parallel (as explained above).

Figure 7B:
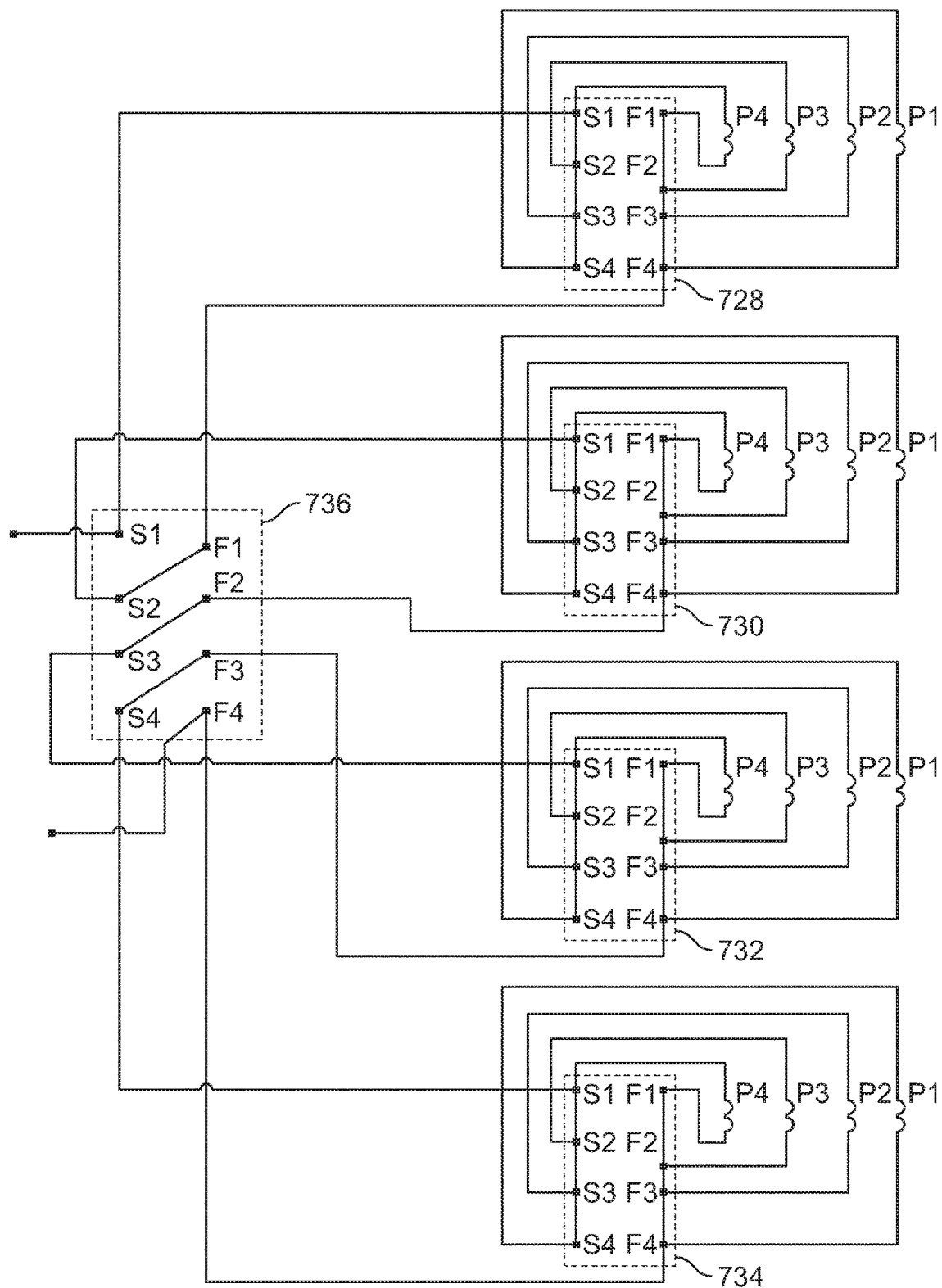
FIG. 7B is a circuit diagram of a primary side of the DC-DC power converter of FIG. 7A including five input connectors according to another example embodiment.

FIG. 7B illustrates example input connectors 728, 730, 732, 734, 736 for obtaining the particular transformer input connections and primary winding connections of the power converter 700. As shown, each input connector includes eight terminals S1-S4 and F1-F4 for connecting to desired components (e.g. windings, terminals, etc.). Although not shown, an output connector including multiple terminals may be employed to obtain the particular transformer output connections of the power converter 700.

Referring back to FIG. 7A, the input voltage V1 and the duty ratio of each phase (e.g., each transformer) can be selected to get a desired output voltage. For example, because the transformer inputs are coupled in series, the voltage across each transformer TX1, TX2, TX3, TX4 is one fourth the input voltage V1. Therefore, if the input voltage V1 is 400V and the turns ratio N is 5:1 (as in FIG. 7A), then the output voltage of each transformer TX1, TX2, TX3, TX4 is 20V (i.e., [400V±4]×[1±5]).

To obtain a desired output voltage Vo of 12V at the power converter output 706 of FIG. 7A, the output voltage of each transformer output 708, 710, 712, 714 should be 12V due to the parallel connection between the transformer outputs. Thus, to obtain this 12V output at the transformer outputs, the duty ratio is set to 0.6 (i.e., desired output voltage±the output voltage of each transformer=12V±20V). This duty ratio calculation assumes ideal conditions (e.g., without additional voltage drops) in the power converter 700.

As the four transformer outputs 708, 710, 712, 714 are coupled in parallel, the total output power of the power converter 700 is four times the output power of each transformer output. Thus, if the power of each transformer output is designed for 1000 W, the total power output of the power converter 700 is 4000 W. Additionally, the current through each transformer output is 83.3 A (i.e., 1000 W±12V).

Figure 8A:
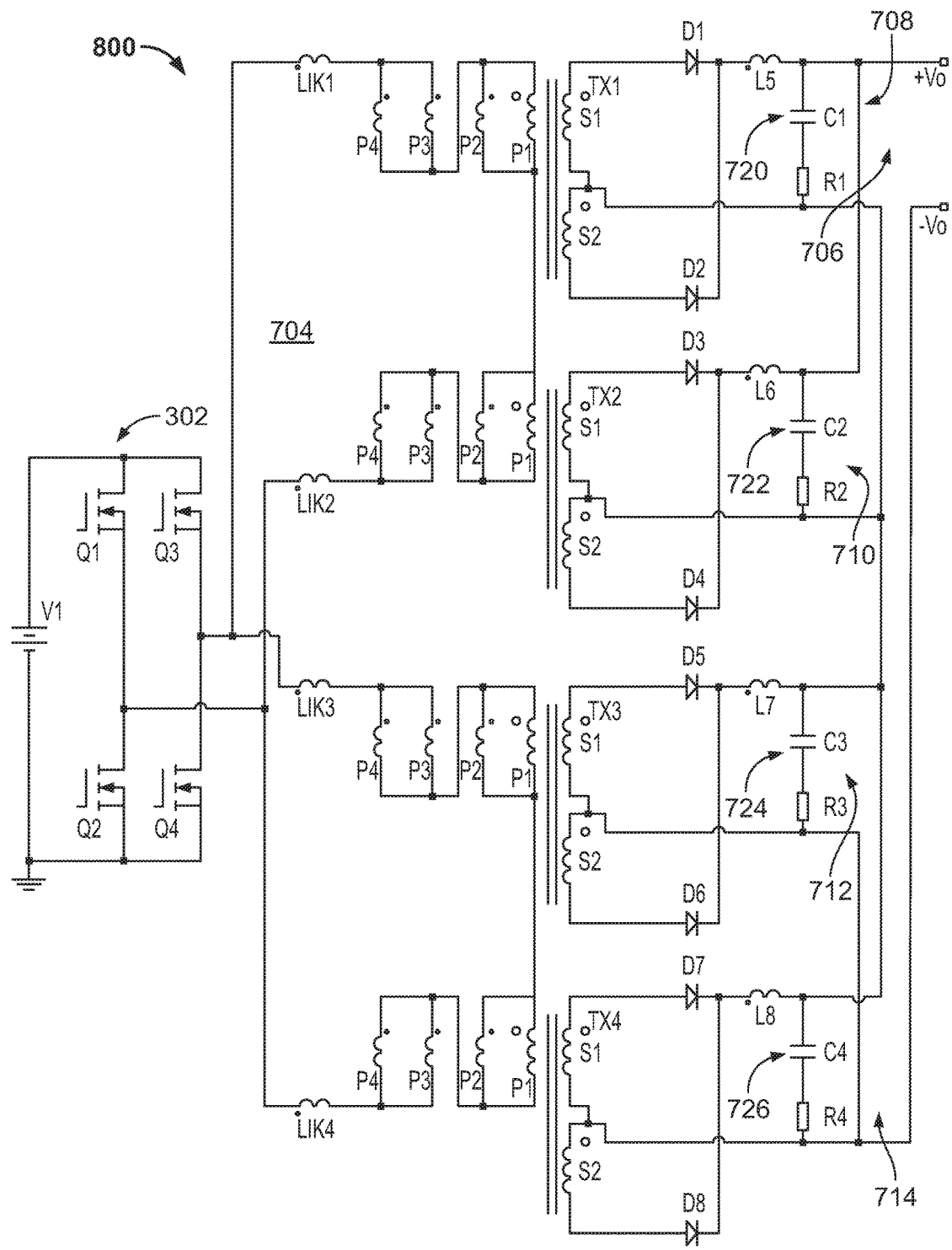
FIG. 8A is a circuit diagram of a DC-DC power converter including four transformers each with its primary windings coupled in a series and parallel combination according to yet another example embodiment.

The power converter 800 of FIG. 8A includes input connectors and an output connector to obtain a 24V output. As shown in FIG. 8A, the primary windings P1, P2, P3, P4 of each transformer TX1, TX2, TX3, TX4 are coupled in the same manner as the primary windings of the transformers TX1, TX2 of FIG. 4. This primary winding configuration results in a turns ratio N of 10:1 as explained above.

Additionally, the transformer inputs of the transformers TX1, TX2 are coupled in series and the transformer inputs of the transformers TX3, TX4 are coupled in series. As shown in FIG. 8A, both series connected transformer inputs are then coupled in parallel with the bridge converter 302. Conversely, the transformer outputs 708, 710 are coupled in parallel and the transformer outputs 712, 714 are coupled in parallel. Both parallel connected transformer outputs are then coupled in series to form the power converter output 706.

Figure 8B:
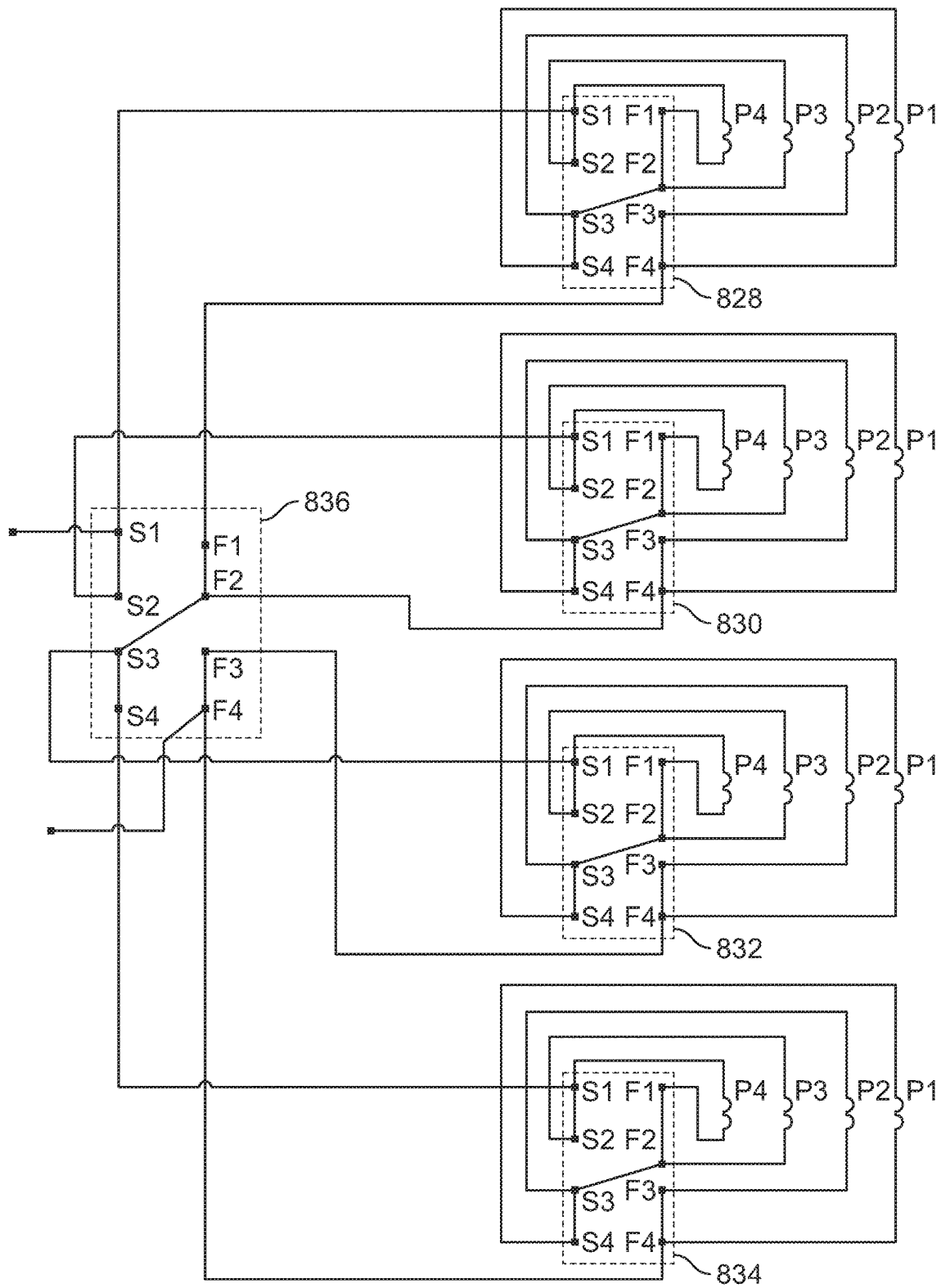
FIG. 8B is a circuit diagram of a primary side of the DC-DC power converter of FIG. 8A including five input connectors according to another example embodiment.

FIG. 8B illustrates example input connectors 828, 830, 832, 834, 836 including similar terminals as those in FIG. 7B. The terminals of FIG. 8B, however, are connected differently to obtain the particular transformer input connections and primary winding connections of the power converter 800. As before, an output connector (not shown) including multiple terminals may be employed to obtain the particular transformer output connections of the power converter 800.

Due to the particular transformer input configuration of the power converter 800 of FIG. 8A, the primary side voltage across each transformer TX1, TX2, TX3, TX4 is half the input voltage V1. Therefore assuming a 400V input as before, the primary side voltage across each transformer is 200V. As a result, the secondary side voltage for each transformer TX1, TX2, TX3, TX4 is 20V, as in FIG. 7A.

As the secondary side voltage is 20V and the duty ratio is 0.6 (as explained above), the voltage of each transformer output is 12V, as in FIG. 7A. However, due to the particular transformer output configuration, the output voltage Vo at the power converter output 706 of FIG. 8A is 24V.

Additionally, as a result of this transformer output configuration, the power at the power converter output 706 of FIG. 8A is two times the power of each pair of parallel connected transformer outputs (e.g., the transformer outputs 708, 710 and the transformer outputs 712, 714). For example, due to the transformer output configuration of FIG. 8A, each pair of parallel connected transformer outputs provides a current of 166.6 A and a voltage of 12V. As such, the power provided at each pair of parallel connected transformer outputs is 2000 W (i.e., 166.6 A×12V). Therefore, the power at the power converter output 706 of FIG. 8A is 4000 W, as in FIG. 7A.

Figure 9A:
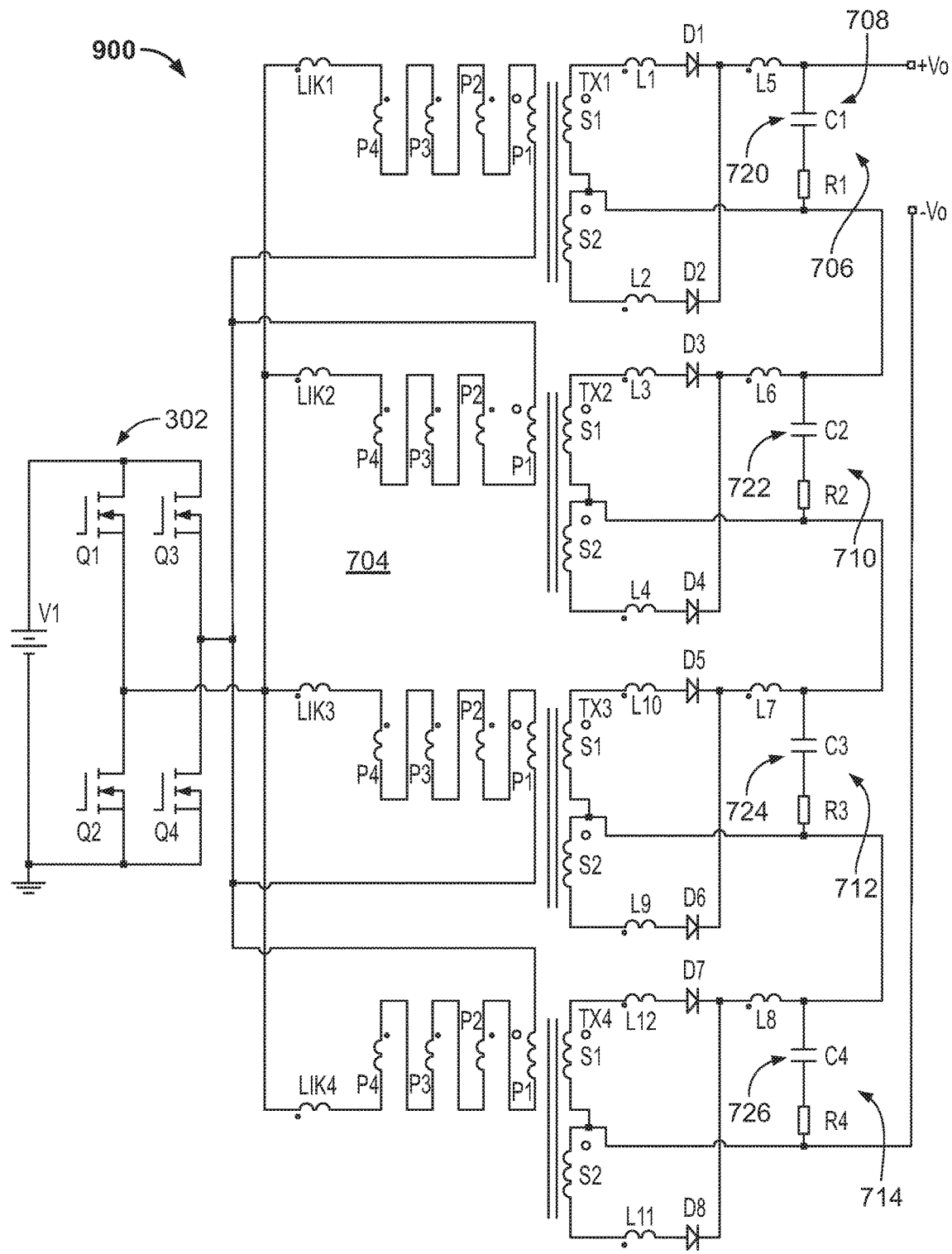
FIG. 9A is a circuit diagram of a DC-DC power converter including four transformers having their inputs coupled in parallel and their outputs coupled in series according to yet another example embodiment.

Similar to the power converters of FIGS. 7A and 8A, the power converter 900 of FIG. 9A includes input connectors and an output connector to obtain a 48V output. For example, the primary windings P1, P2, P3, P4 of each transformer TX1, TX2, TX3, TX4 of FIG. 8A are coupled in series as explained above with reference to FIG. 6. This series primary winding configuration results in a turns ratio N of 20:1, as explained above.

Figure 9B:
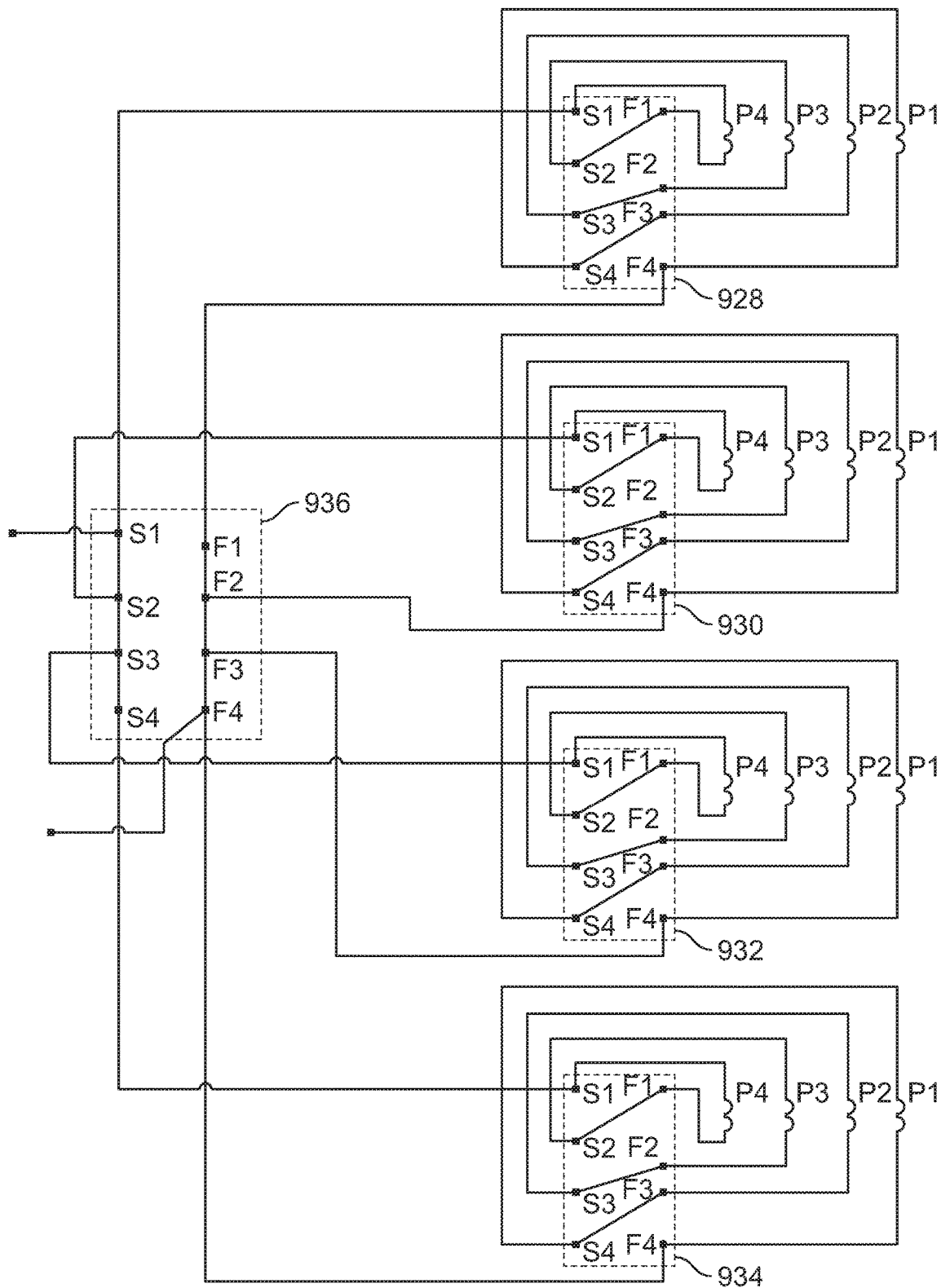
FIG. 9B is a circuit diagram of a primary side of the DC-DC power converter of FIG. 9A including five input connectors according to another example embodiment.

Additionally, the transformer inputs for the transformers TX1, TX2, TX3, TX4 are coupled in parallel and the transformer outputs 708, 710, 712, 714 of the transformers are coupled in series. Example input connectors 928, 930, 932, 934, 936 to obtain the particular transformer input connections and primary winding connections of the power converter 900 are shown in FIG. 9B.

If the input voltage V1 is 400V as before, then the primary side voltage of each transformer TX1, TX2, TX3, TX4 of FIG. 9A is 400V due to the parallel transformer inputs and the secondary side voltage of each transformer is 20V, due to the turns ratio of 20:1. However, the voltage at each transformer output is 12V (e.g., due to the duty ratio of 0.6), as explained above. Thus, because the transformer outputs 708, 710, 712, 714 of FIG. 9A are coupled in series, the output voltage at the power converter output 706 is 48V.

Additionally, the current flowing through each transformer output 708, 710, 712, 714 of FIG. 9A is 83.3 A, as explained above. Therefore, the output power at the power converter output 706 in FIG. 9A is 4000 W (i.e., 83.3 A×48V), as in FIGS. 7A and 8A. Thus, while the power converters 700, 800, 900 of FIGS. 7A, 8A, and 9A are able to provide different output voltages (e.g., 12V, 24V, 48V, respectively), the output power of each power converter remains the same (e.g., 4000 W).

Additionally, the losses, leakage energy and delay time due to leakage inductance (inductance Llk1, Llk2, Llk3, Llk4) and the total magnetizing current due to magnetizing inductances (Lm1, Lm2, Lm3, Lm4) in the power converters 700, 800, 900 of FIGS. 7A, 8A, and 9A are substantially similar as those described above relative to the power converters of FIGS. 3-6, assuming the same conditions apply.

Figure 10:
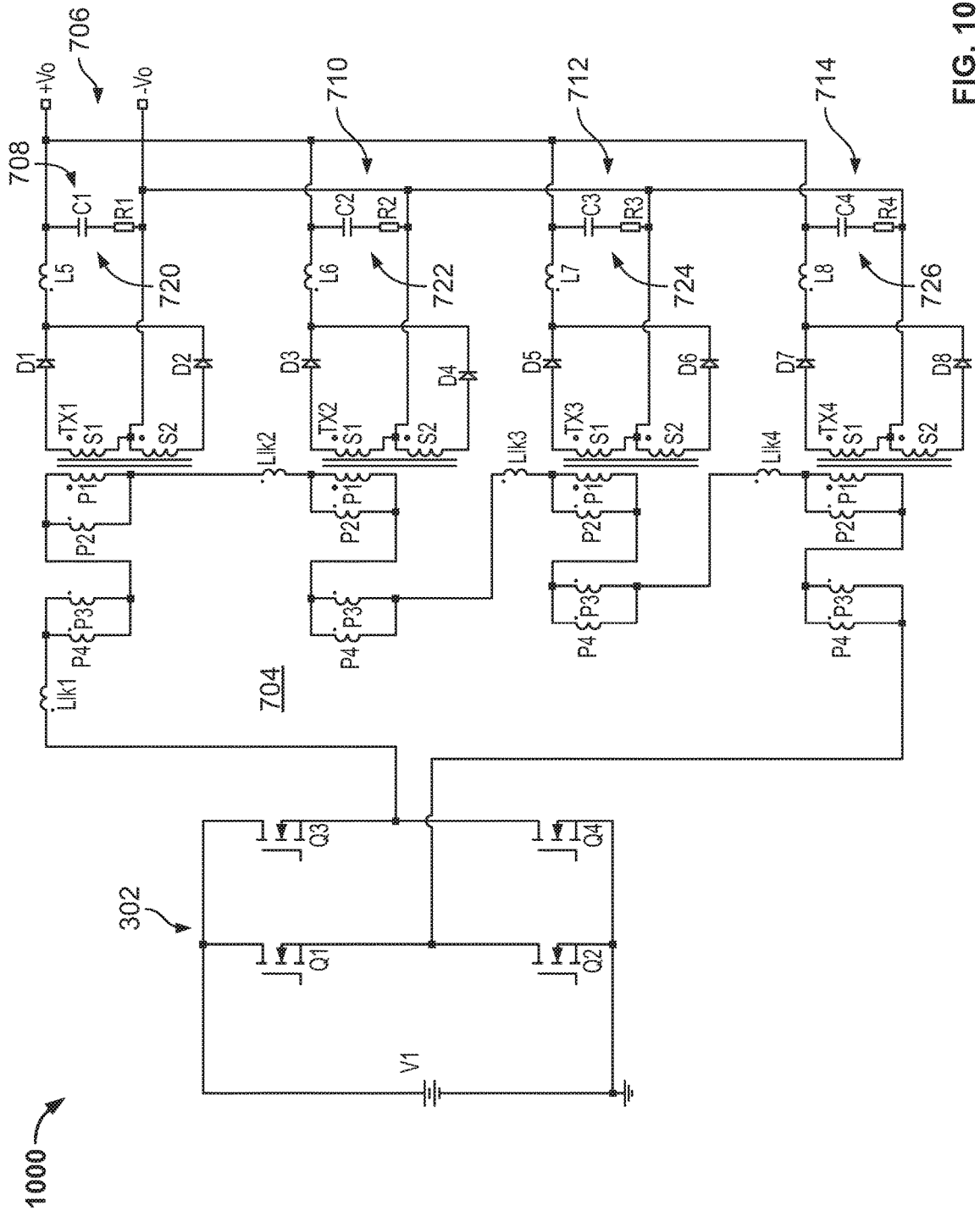
FIG. 10 is a circuit diagram of a DC-DC power converter including four transformers having their inputs coupled in series and their outputs coupled in parallel according to yet another example embodiment.
Figure 11:
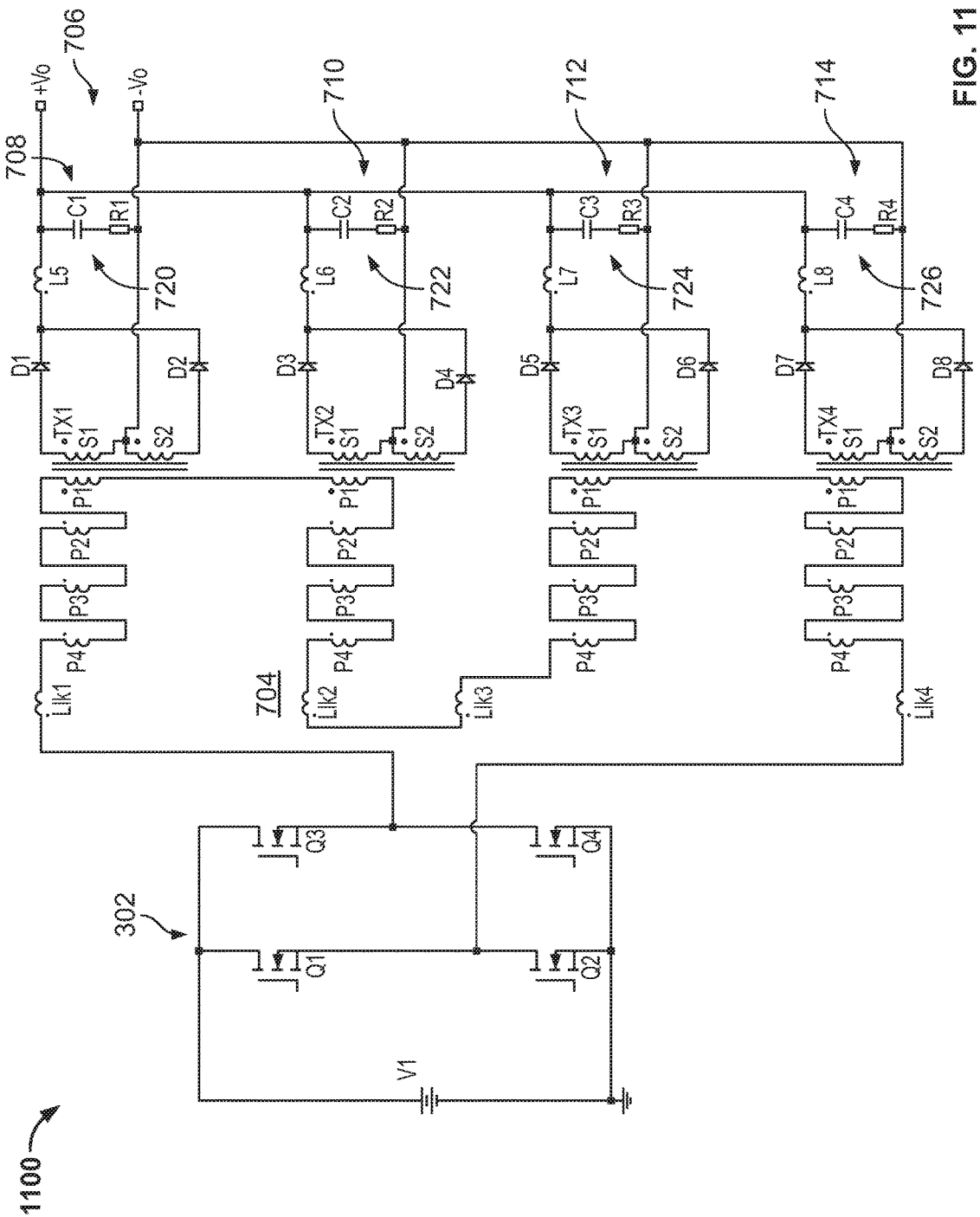
FIG. 11 is a circuit diagram of a DC-DC power converter including four transformers each having a series primary winding configuration according to another example embodiment.

The power converters 1000, 1100 of FIGS. 10 and 11 include similar transformer input connections, transformer output connections, and primary winding connections as the power converters 500, 600 of FIGS. 5 and 6, respectively. The power converters 1000, 1100 of FIGS. 10 and 11, however, include four transformers TX1, TX2, TX3, TX4 instead of two transformers TX1, TX2, as explained above. The output current, voltage, and power of each power converter 1000, 1100 can be determined as explained above. In the particular examples of FIGS. 10 and 11, the power converter 1000 provides 6V at 2000 W and the power converter 1100 provides 3V at 1000 W. Thus, the power converters 1000, 1100 can provide a lower output voltage along with a lower output power and efficiency as compared to the output voltage, output power, and efficiency of the power converters of FIGS. 7A, 8A and 9A.

Although FIGS. 3-11 each illustrate a power converter including a full bridge converter (e.g., a phase-shifted full bridge power converter) coupled to transformers, it should be understood that the teachings herein may be used with other suitable switching circuit topologies including, for example, forward power converters (e.g., interleaved forward power converters, etc.), other bridge power converters (e.g., half bridge power converters, etc.), resonant power converters (e.g., LLC power converters, series resonant power converters, interleaved LLC power converters, interleaved series resonant power converters, etc.), etc.

Figure 12:
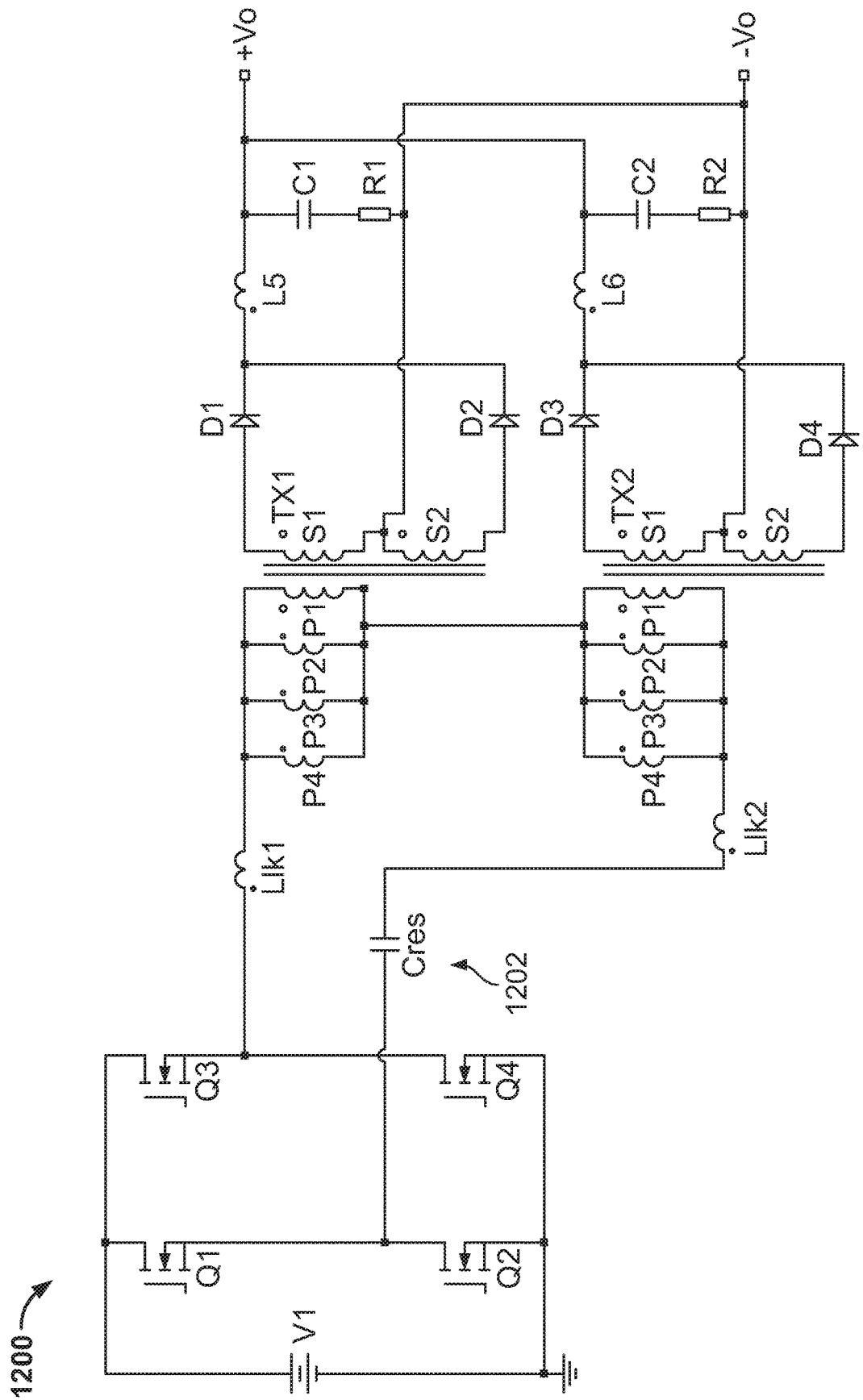
FIG. 12 is a circuit diagram of a DC-DC power converter similar to the DC-DC power converter of FIG. 3A but including a LLC resonant power converter according to yet another example embodiment.
Figure 13:
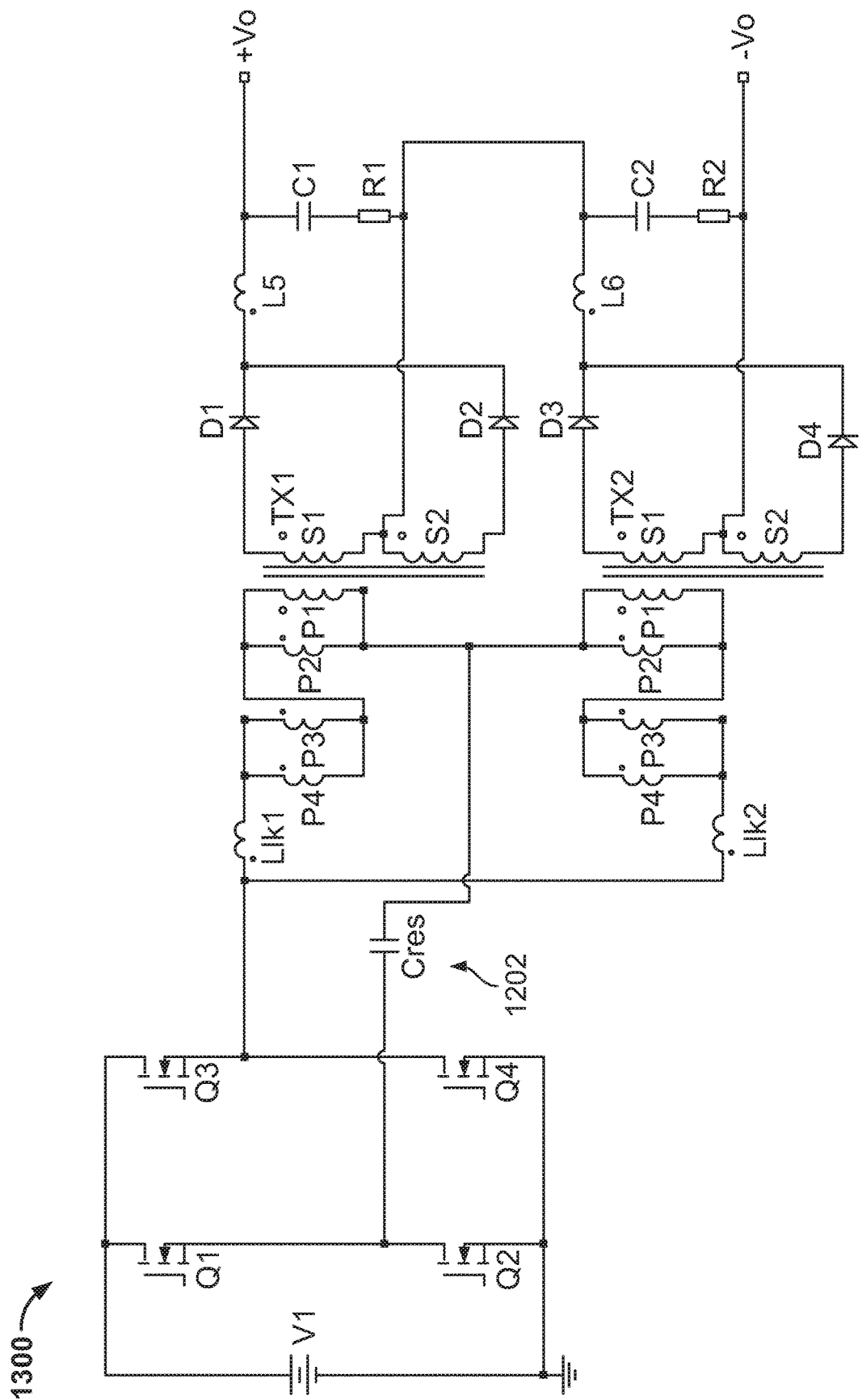
FIG. 13 is a circuit diagram of a DC-DC power converter similar to the DC-DC power converter of FIG. 4A but including a LLC resonant power converter according to another example embodiment.

For example, FIGS. 12 and 13 illustrate DC-DC power converters 1200, 1300 substantially similar to the power converters 300, 400 of FIGS. 3A and 4B, but each including an LLC resonant power converter 1202. Like the power converters 300, 400 of FIGS. 3A and 4B, the power converters 1200, 1300 of FIGS. 12 and 13 can receive a 12 V/500 W input, and include input connectors and output connectors {as explained herein) to obtain a 6V output and a 12V output, respectively. This change in the output voltage can occur without changing the output power (e.g., 1000 W), as explained above.

As explained above, inductances Llk1, Llk2 of the power converters 1200, 1300 represent the total leakage inductance of each transformer TX1, TX2. The leakage inductances Llk1, Llk2 are used as resonant inductors in the power converters 1200, 1300. These inductors along with a resonant capacitor Cres of each power converter 1200, 1300 form the resonant tank of the LLC resonant circuit.

Using the resonant capacitor Cres and the leakage inductances Llk1, Llk2 of FIG. 12, the resonant frequency Fres of the power converter 1200 can be calculated by equation (8) below.

$$Fres = \frac{1}{2 \times \pi \times \sqrt{(Llk1 + Llk2) \times Cres}} \quad (8)$$

Where (Llk1+Llk2) represents the total leakage inductance of the power converter 1200. Assuming the leakage inductances Llk1, Llk2 are the same (as before), the resonant frequency Fres can be calculated by equation (9) below.

$$Fres = \frac{1}{2 \times \pi \times \sqrt{2 \times Llk1 \times Cres}} = \frac{1}{2 \times \pi \times \sqrt{2 \times Llk2 \times Cres}} \quad (9)$$

As explained above, each transformer TX1, TX2 includes a magnetizing inductance Lm1, Lm2. As the primary sides of the transformers TX1, TX2 are coupled in series, a total magnetizing inductance is the sum of each magnetizing inductance Lm1, Lm2.

A ratio of the total magnetizing inductance to the total leakage inductance can be a useful parameter for designing LLC resonant power converters. For example, this ratio may be used to determine a gain at the resonant frequency Fres. The ratio of the total magnetizing inductance to the total leakage inductance of the power converter 1200 can be calculated by equation (10) below.

$$\lambda = \frac{(Lm1 + Lm2)}{(Llk1 + Llk2)} \quad (10)$$

Assuming the magnetizing inductances Lm1, Lm2 are the same (as before), the ratio of equation (10) can be simplified to equation (11) below.

$$\lambda = \frac{2 \times Lm1}{2 \times Llk1} = \frac{Lm1}{Llk1} = \frac{Lm2}{Llk2} \quad (11)$$

As shown in FIG. 13, the transformer inputs of the transformers TX1, TX2 are coupled in parallel. As such, each transformer TX1, TX2 will see the total input voltage V1, instead of half the input voltage V1 as each series connected transformer TX1, TX2 of FIG. 12. However, the flux density of the transformers TX1, TX2 of FIG. 13 may remain substantially the same as the transformers of FIG. 12 because the primary turns of the transformers of FIG. 13 are doubled compared to the primary turns of the transformers of FIG. 12, as explained above.

Additionally, the leakage inductances Llk1, Llk2 and the magnetizing inductances Lm1, Lm2 of the power converter 1300 in FIG. 13 are different than those of FIG. 12. This is because the inductances are proportional to the square of the total number of primary turns as explained above. Thus, in the particular example of FIG. 13, the leakage inductances Llk1, Llk2 and the magnetizing inductances Lm1, Lm2 are four times larger than the leakage inductances and magnetizing inductances in FIG. 12. Thus, assuming the leakage inductances Llk1, Llk2 are equal and the magnetizing inductances Lm1, Lm2 are equal (as before), the total leakage inductance and the total magnetizing inductance of the power converter 1300 can be calculated by equations (12) and (13) below.

$$\frac{16 \times Llk1 \times Llk2}{4 \times (Llk1 + Llk2)} = 4 \times \frac{Llk1 \times Llk2}{Llk1 + Llk2} = \frac{4 \times Llk1^2}{2 \times Llk1} = 2 \times Llk1 \quad (12)$$

$$\frac{16 \times Lm1 \times Lm2}{4 \times (Lm1 + Lm2)} = 4 \times \frac{Lm1 \times Lm2}{Lm1 + Lm2} = \frac{4 \times Lm1^2}{2 \times Lm1} = 2 \times Lm1 \quad (13)$$

The total leakage inductance and the total magnetizing inductance of equations (12) and (13) then can be used to find the resonant frequency Fres and the ratio of the total magnetizing inductance to the total leakage inductance for the power converter 1300. Equations (14) and (15) below can be used to calculate the resonant frequency Fres and the ratio, respectively.

$$Fres = \frac{1}{2 \times \pi \times \sqrt{2 \times Llk1 \times Cres}} = \frac{1}{2 \times \pi \times \sqrt{2 \times Llk2 \times Cres}} \quad (14)$$

$$\lambda = \frac{2 \times Lm1}{2 \times Llk1} = \frac{Lm1}{Llk1} = \frac{Lm2}{Llk2} \quad (15)$$

As can be seen, the resonant frequency equation (14) and the ratio equation (15) of the power converter 1300 are the same as the resonant frequency equation (9) and the ratio equation (11) of the power converter 1200.

Additionally, the current through each secondary side of the transformers TX1, TX2 is the same for each power converter 1200, 1300 and the energy handled by each resonant inductance (Llk1, Llk2) is the same for each power converter 1200, 1300 for a given power. As such, the gain of each power converter 1200, 1300 remains the same.

Further, and similar to the power converters of FIGS. 3-6, zero voltage switching may be achieved with switches in the power converters 1200, 1300 of FIGS. 12 and 13 due to, for example, the leakage inductances, the magnetizing inductances, etc. as explained above.

In some cases, the leakage inductances Llk1, Llk2 may not be equal. In such cases, the total leakage inductance Llkt of the power converter 1200 equals the sum of the leakage inductances Llk1, Llk2 as explained above. The total leakage inductance Llkt of the power converter 1300 can be calculated by equation (16) below.

$$Llkt = \frac{16 \times Llk1 \times Llk2}{4 \times (Llk1 + Llk2)} = 4 \times \frac{Llk1 \times Llk2}{Llk1 + Llk2} \quad (16)$$

Thus, a ratio between the total leakage inductance of the power converters 1200, 1300 can be calculated by equation (17) below.

$$\sigma = \frac{Llkt \text{ of the power converter } 1300}{Llkt \text{ of the power converter } 1200} = \frac{4 \times \frac{Llk1 \times Llk2}{Llk1 + Llk2}}{Llk1 + Llk2} = \frac{4 \times Llk1 \times Llk2}{(Llk1 + Llk2)^2} \quad (17)$$

A percent difference between the total leakage inductances of the power converters 1200, 1300 can be determined by subtracting the ratio σ from one and then multiplying that by one hundred. For example, the leakage inductance Llk1 may be 1.5 times larger than the leakage inductance Llk2. In such a case, the leakage inductance Llk2 may be 2 uH and the leakage inductance LIk1 may be 3 uH (i.e., LIk1 is 1.5 times larger than LIk2). As such, the total leakage inductance of the power converter 1300 would be 4.8 uH (using equation (16) above) and the total leakage inductance of the power converter 1200 would be 5 uH (the sum of the leakage inductances LIk1, LIk2). Thus, in the particular example, the ratio σ equals 0.96 (i.e., 4.8±5). Therefore, the percent difference between this particular example leakage inductance values and an ideal condition (e.g., where the total leakage inductance is the same for each power converter 1200, 1300) is four percent (i.e., (1−0.96)× 100).

This four percent difference will result in a change in resonant frequency of about two percent between the power converters 1200, 1300. In resonant power converter designs where the leakage inductance is used as the resonant inductor (as in the power converters 1200, 1300), it is preferable that the difference between the leakage inductances is tightly controlled so not to compromise performance.

In some cases, it may be preferred to use external inductors for the resonant inductors instead of the leakage inductances LIk1, LIk2. Generally, these external inductors are much larger than the leakage inductances LIk1, LIk2. In such cases, the effect of the difference in the leakage inductances LIk1, LIk2 is again negligible.

Figure 14:
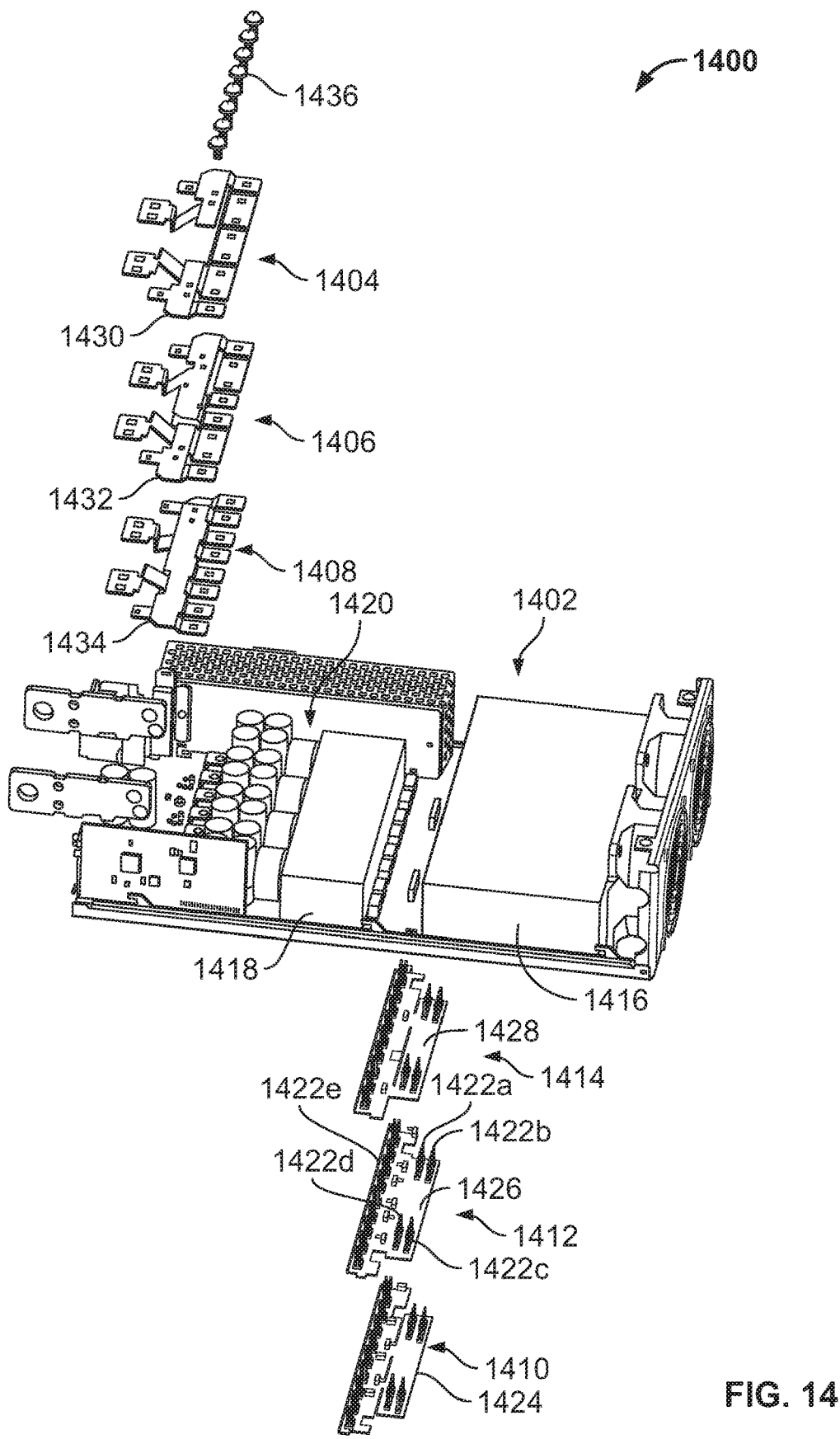
FIG. 14 is an isometric view of a power converter including three input connectors and three output connectors according to yet another example embodiment.

The input connectors and/or the output connectors disclosed herein may be positioned on one or more circuit boards (e.g., printed circuit boards, etc.) and/or bus bars. For example, FIG. 14 illustrates a DC-DC power converter 1400 including a power circuit module 1402, input connectors 1410, 1412, 1414 each for coupling to the power circuit module 1402, and output connectors 1404, 1406, 1408 each for coupling to the power circuit module 1402. The power circuit module 1402 (e.g., the body) includes power switch(es) 1416, multiple transformers 1418, multiple filters 1420, multiple inputs and multiple outputs. Although not shown, each transformer 1418 includes two or more primary windings and at least one secondary winding. The power switch(es) 1416 and the transformers 1418 are each shown as a box for clarity.

As explained herein, the input connectors 1410, 1412, 1414 are each able to change a connection between each of the primary windings to adjust a turns ratio of each transformer 1418 and a connection between the inputs of the power circuit module 1402. For example, and as shown in FIG. 14, the input connector 1412 includes five connectors 1422a-e for changing the connection between each of the primary windings and the connection between the inputs of the power circuit module 1402. The input connector 1414 can include one or more different connectors than the input connector 1412 to change the connections, as explained herein. Similarly, the output connectors 1404, 1406, 1408 each include one or more connectors for changing a connection between the outputs of the power circuit module 1402.

The DC-DC power converter 1400 provides different output voltages depending on which input connector 1410, 1412, 1414 and which output connector 1404, 1406, 1408 is used, as explained herein. For example, a user may select the input connector 1410 and the output connector 1404 for coupling to the power circuit module 1402. In that particular example, the power converter 1400 may provide an output voltage of about 48 volts. Alternatively, a user may select the input connector 1414 and the output connector 1408 for coupling to the power circuit module 1402. In such cases, the power converter 1400 may provide an output voltage of about 12 volts.

Each of the different input connectors 1410, 1412, 1414 may be positioned on one circuit board (e.g., a printed circuit board). For example, and as shown in FIG. 14, the connectors (e.g., the connectors 1422a-e) of each different input connector 1410, 1412, 1414 is positioned on circuit boards 1424, 1426, 1428, respectively. Each individual circuit board may be placed in the power converter by coupling its connectors with corresponding connectors (not shown) in the power circuit module 1402. Alternatively, each of the different input connectors 1410, 1412, 1414 may be positioned on more than one circuit board and/or another suitable substrate if desired.

Similarly, each of the different output connectors 1404, 1406, 1408 may be formed by one bus bar. For example, and as shown in FIG. 14, the output connectors 1404, 1406, 1408 are formed by bus bars 1430, 1432, 1434, respectively. Each bus bar may be coupled to the power circuit module 1402 via screws 1436 (as shown in FIG. 14) and/or another suitable coupling device. Alternatively, each of the different output connectors 1404, 1406, 1408 may be formed by more than one bus bar and/or by another suitable structure if desired.

Additionally, although the rectification circuits of FIGS. 3-13 are coupled to the secondary windings S1, S2 to form center tapped full wave rectifiers, it should be understood that other suitable rectification circuits may be used in any one of the power converters disclosed herein. For example, any one of the power converters may include half wave rectifiers, rectification circuits having synchronous rectifiers, etc.

Further, although the filter circuits of FIGS. 3-13 include LC filters, it should be understood that other suitable filters may be employed if desired. For example, any one of the power converters may include one or more filters including only capacitance components, only inductance components, etc.

The DC-DC power converters disclosed herein may be employed in various applications in which an output voltage is desired to change. For example, the DC-DC power converters may be used in industrial applications, medical applications, testing applications, etc. Additionally, the power converters may be used in power converters including, for example, AC-DC power converters, etc.

As explained herein, modifying the transformer input connections, the transformer output connections, and/or the primary winding connections allow a power converter to provide different output voltages (e.g., regulated output voltages). As such, costs (e.g., manufacturing costs, maintenance costs, inventory costs, development costs, etc.) may be lower than traditional systems that require multiple power converters to provide different output voltages.

Additionally, the power converters employing the teachings experience high efficiency due to low voltage switches. For example, the power switches disclosed herein and/or the rectification circuits disclosed herein may include semiconductor switches and/or other suitable low voltage switches.

The power converters may also achieve desired current, voltage and power sharing even with different parasitic inductances between the transformers, the transformer outputs (e.g., on the output side of the filtering circuits), and/or the transformer inputs. This is due to the transformer input connections and the transformer output connections. For example, and as shown in FIGS. 3-13, the primary side connections and the secondary side connections are coupled in an opposite configuration. As such, when the transformer inputs are coupled in series (or in parallel), the transformer outputs are coupled parallel (or in series).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A DC-DC power converter kit comprising:
a body including a plurality of DC inputs configured to couple to one another to form a power converter input, a plurality of outputs configured to couple to one another to form a power converter output, and a plurality of transformers, each transformer including two or more primary windings for coupling to one DC input of the plurality of DC inputs and at least one secondary winding for coupling to one output of the plurality of outputs;
a plurality of input connectors each configured to directly connect between the two or more primary windings of said each transformer and connect the plurality of DC inputs for providing DC power from the plurality of DC inputs to said each transformer, the plurality of input connectors each configured to change at least one of a connection between each of the two or more primary windings to adjust a turns ratio of said each transformer and a connection between the plurality of DC inputs; and
a plurality of output connectors each configured to connect between the plurality of transformers and the plurality of outputs to change a connection between the plurality of outputs;
the power converter output providing a first output voltage when using a first set of the plurality of input connectors and a first output connector of the plurality of output connectors, and the power converter output providing a second output voltage different than the first output voltage when using a second set of the plurality of input connectors and a second output connector of the plurality of output connectors;
wherein when the connection between the plurality of DC inputs is a parallel connection, the connection between the plurality of outputs is a series connection, and wherein when the connection between the plurality of DC inputs is a series connection, the connection between the plurality of outputs is a parallel connection.

2. The DC-DC power converter kit of claim 1 wherein the power converter output is configured to provide the first output voltage or the second output voltage without changing an output power at the power converter output.

3. The DC-DC power converter kit of claim 1 wherein the plurality of transformers includes four transformers.

4. The DC-DC power converter kit of claim 1 wherein the plurality of input connectors are each configured to change the connection between said each of the two or more primary windings to adjust a turns ratio of said each transformer.

5. The DC-DC power converter kit of claim 1 wherein the plurality of input connectors are each configured to change the connection between said each of the two or more primary windings to adjust a turns ratio of said each transformer and the connection between the plurality of DC inputs.

6. The DC-DC power converter kit of claim 1 wherein the connection between said each of the two or more primary windings includes a parallel connection.

7. The DC-DC power converter kit of claim 1 wherein the connection between said each of the two or more primary windings includes a series connection.

8. The DC-DC power converter kit of claim 1 wherein the connection between said each of the two or more primary windings includes a combination of a series and a parallel connection.

9. The DC-DC power converter kit of claim 8 wherein said each transformer includes four primary windings.

10. The DC-DC power converter kit of claim 1 wherein the body includes a plurality of rectification circuits each coupled to the at least one secondary winding of said each transformer.

11. The DC-DC power converter kit of claim 1 wherein the body includes a plurality of filters each coupled to the at least one secondary winding of said each transformer.

12. The DC-DC power converter kit of claim 1 wherein the body includes a switching circuit coupled to the plurality of DC inputs.

13. The DC-DC power converter kit of claim 12 wherein the switching circuit includes a full bridge converter.

14. The DC-DC power converter kit of claim 12 wherein the switching circuit includes a resonant converter.

15. The DC-DC power converter kit of claim 1 wherein the first set of the input connectors are positioned on one or more circuit boards.

16. The DC-DC power converter kit of claim 1 wherein the first output connector is formed by one or more bus bars.

17. A method for adjusting an output voltage of a DC-DC power converter including a plurality of DC inputs configured to couple to one another to form a power converter input, a plurality of outputs configured to couple to one another to form a power converter output, and a plurality of transformers, each transformer including two or more primary windings for coupling to one input of the plurality of DC inputs and at least one secondary winding for coupling to one output of the plurality of outputs, the method comprising:
directly connecting a first set of a plurality of input connectors between the two or more primary windings of said each transformer, connecting the first set of the plurality of input connectors between the plurality of DC inputs for providing DC power from the plurality of DC inputs to said each transformer, and connecting an output connector of a plurality of output connectors between the plurality of transformers and the plurality of outputs to provide at the power converter output a first output voltage; and
directly connecting a second set of the plurality of input connectors between the two or more primary windings of said each transformer, connecting the second set of the plurality of input connectors between the plurality of DC inputs for providing DC power from the plurality of DC inputs to said each transformer, and connecting another output connector of the plurality of output connectors between the plurality of transformers and the plurality of outputs to provide at the power converter output a second output voltage different than the first output voltage;
wherein the input connectors are each configured to change at least one of a connection between each of the two or more primary windings to adjust a turns ratio of said each transformer and a connection between the plurality of DC inputs, wherein the output connectors are each configured to change a connection between the plurality of outputs, wherein when the connection between the plurality of DC inputs is a parallel connection, the connection between the plurality of outputs is a series connection, and wherein when the connection between the plurality of DC inputs is a series connection, the connection between the plurality of outputs is a parallel connection.

* * * * *